US012093069B2

(12) United States Patent
Mahmoodi et al.

(10) Patent No.: US 12,093,069 B2
(45) Date of Patent: Sep. 17, 2024

(54) LOW LINE-SENSITIVITY AND PROCESS-PORTABLE REFERENCE VOLTAGE GENERATOR CIRCUIT

(71) Applicant: SanDisk Technologies LLC, Addison, TX (US)

(72) Inventors: Mohammad Reza Mahmoodi, Goleta, CA (US); Martin Lueker-Boden, Fremont, CA (US)

(73) Assignee: SANDISK TECHNOLOGIES LLC, Addison, TX (US)

( * ) Notice: Subject to any disclaimer, the term of this patent is extended or adjusted under 35 U.S.C. 154(b) by 73 days.

(21) Appl. No.: 17/903,306

(22) Filed: Sep. 6, 2022

(65) Prior Publication Data

US 2024/0077903 A1 Mar. 7, 2024

(51) Int. Cl.
*G05F 3/26* (2006.01)
*G05F 1/46* (2006.01)

(52) U.S. Cl.
CPC .............. *G05F 3/267* (2013.01); *G05F 1/468* (2013.01)

(58) Field of Classification Search
CPC ................................. G05F 1/468; G05F 3/267
See application file for complete search history.

(56) References Cited

U.S. PATENT DOCUMENTS

2009/0051342 A1* 2/2009 Peng ......................... G05F 3/30 323/313
2011/0169561 A1* 7/2011 Chu .......................... G05F 3/30 327/539
2021/0356982 A1* 11/2021 Cheng ..................... H02M 1/42

OTHER PUBLICATIONS

Dastgerdi et al., "A Novel Two Stage Cross Coupled Architecture for Low Voltage Low Power Voltage Reference Generator," Analog Integrated Circuits and Signal Processing, 99(2), pp. 393-402, Jan. 3, 2019 (https://doi.org/10.1007/s10470-018-1379-y).
Thakur et al., "Low Temperature Coefficient and Low Line Sensitivity Subthreshold Curvature-Compensated Voltage Reference," International Journal of Circuit Theory and Applications, 48(11), pp. 1900-1921, Aug. 12, 2020 (https://doi.org/10.1002/cta.2857).

(Continued)

*Primary Examiner* — Jue Zhang
*Assistant Examiner* — Lakaisha Jackson
(74) *Attorney, Agent, or Firm* — Sheppard, Mullin Richter & Hampton LLP

(57) ABSTRACT

Systems and methods are provided for generating a stable DC reference voltage that has low sensitivity to operating temperature and supply voltage variations and is stable across process corners using complimentary metal-on-semiconductor field-effect transistors (MOSFETS). In an example implementation, a reference voltage generator circuit is provided that includes complimentary MOSFETs including a first complimentary MOSFET connected to a first node and having a first threshold voltage, and a second complimentary MOSFET connected to a second node and having a second threshold voltage that is greater than the first threshold voltage. The reference voltage generator circuit feeds the first node a first current based on mirroring a second current at the second node and outputs a stable DC reference voltage based on the first and second complimentary MOSFETs and configured operating in respective saturation regions.

20 Claims, 22 Drawing Sheets

(56) References Cited

OTHER PUBLICATIONS

Noshahr et al., "A 2.77μW, 80 ppm/° C. Temperature Coefficient Voltage Reference for Biomedical Implants," 26th IEEE International Conference on Electronics, Circuits and Systems (ICECS), Nov. 2019, pp. 362-365 (https://doi.org/10.1109/ICECS46596.2019.8964991).

Zhang et al., "A Novel Low Line Regulation CMOS Voltage Reference Without BJTs and Resistors," SAIEE Africa Research Journal, 111(4), pp. 130-137, Dec. 2020 (https://doi.org/10.23919/SAIEE.2020.9194381).

Mohammed et al., "Design of a Sub 1-V MOSFET Based Voltage Reference Circuit Operating in Subthreshold Region," 2013 IEEE 20th International Conference on Electronics, Circuits, and Systems (ICECS), Dec. 11, 2013, pp. 897-900 (https://doi.org/10.1109/ICECS.2013.6815558).

* cited by examiner

LOW LINE-SENSITIVITY AND PROCESS-PORTABLE REFERENCE VOLTAGE GENERATOR CIRCUIT

BACKGROUND

Voltage reference circuits are used to generate a stable direct current (DC) reference voltages, which are minimally affected by process variation, voltage fluctuation, or temperature drift (PVT). Voltage reference circuits may be used as building blocks for integrated circuit (IC) design, such as analog, digital and mixed-signal circuits where precision voltage or current is needed. Because of their critical role in microelectronics, different techniques, technologies and circuit configurations have been applied to achieve such precision voltage.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Reference voltage generator circuits are widely used in IC design to generate a stable direct current (DC) reference voltages. The increasing development of largescale IC necessitates the need for accurate and stable voltage references. Furthermore, accurate and precise voltage references directly impact computation accuracy of ICs, which may translate to an impact in the performance of the overall system in which an IC is included. For example, in the case of Double Data Rate 5 (DDR5) memory design, an increase in precision and stability of a reference voltage, across ranges of PVT variations, translates to an increase in power savings in the circuitry (e.g., by transmitter and receiver circuitry) because the circuitry need not be overdesigned or redundantly designed to ensure they are able to function in across PVT variation ranges. Thus, it is preferentially to provide high precision references with low sensitivity to PVT variations.

Figure 1:
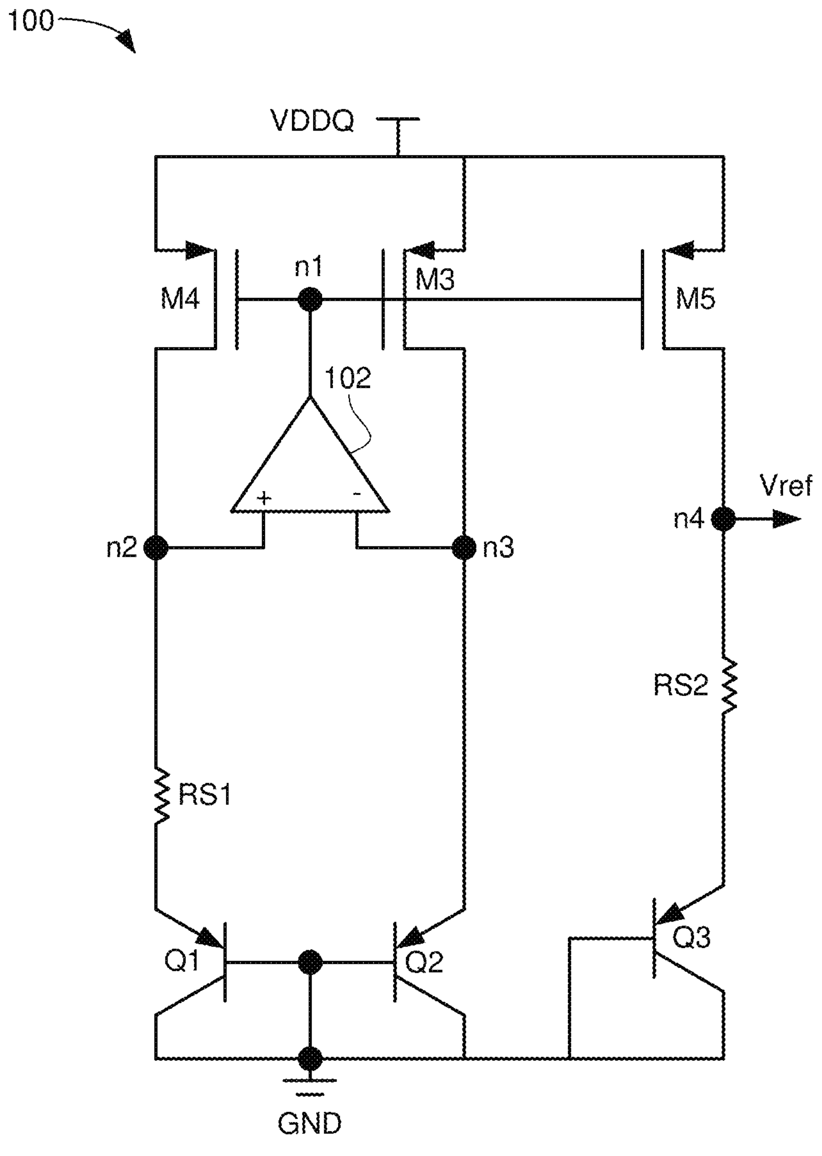
FIG. 1 depict a circuit implementation of a bandgap voltage reference circuit.

Conventional reference voltage generators, a such as those having the example circuit implementation depicted in FIG. 1, used in industry to generate stable DC reference voltage are conventionally based on bandgap voltages of semiconductor junctions. The conventional bandgap reference voltage generator circuits are generally implemented using bipolar junction transistors (BJTs) to generate two voltages or currents with opposite temperature characteristics, thus producing a voltage independent of absolute temperature. In the conventional circuits, a base-emitter voltage ($V_{BE}$) of a bipolar junction transistor (BJT) are usually used to generate a negative temperature coefficient (TC) voltage, and a positive TC voltage is generated by using a differential base-emitter voltage, resistors and thermal voltage. As $V_{BE}$ is not a linear with respect to temperature, a voltage with low TC cannot be achieved without a first or high order temperature compensation. In order to solve this problem, a number of compensation circuits are proposed, such as logarithmic-curvature compensation circuit, piecewise liner compensation circuits, etc.

As alluded to above, FIG. 1 depicts an example circuit implementation 100 of an existing bandgap reference voltage generator for generating a reference voltage $V_{ref}$. The circuit 100 includes electrical devices M3, M4, and M5, which may be p-channel metal-oxide-semiconductor (MOS) field-effect transistors (FETs) (also referred to as pMOS transistors). Gate terminals of devices M3, M4, and M5 are coupled to an output terminal of an operational amplifier 102 at node n1, while the drain terminals of devices M3 and M4 are coupled to negative and positive input terminals of the operational amplifier 102 via nodes n2 and n3, respectively. A first terminal of a resistor RS1 is coupled to node n2 and a second terminal is coupled to an emitter terminal of BJT Q1. An emitter terminal of BJT Q2 is coupled to node n3, and the collector terminals of BJT Q1 and BJT Q2 are coupled to a ground GND. The base terminals of BJT Q1 and BJT Q2 are coupled to each other, as well as to ground GND. Circuit 100 also includes BJT Q3 having a base terminal and a collector terminal coupled to ground GND, while the emitter terminal is connected to a first terminal of resistor RS2. The second terminal of resistor RS2 is coupled to the drain terminal of device M4 via node n4, from which the reference voltage $V_{ref}$ is output.

The operational amplifier 102 operates to ensure that the voltage at node n2 and node n3 will be the same. Additionally, due to devices M3 and M4, the current at nodes n2 and n3 are the same. The current through device M4, which is drawn to node n3 is determined by the ratio of the area of the emitter of BJT Q2 over the area of the emitter of BJT Q1 and the resistance of resistor RS1 (e.g., $rs_1$). Thus, the difference of the base-to-emitter voltage of Q2 (e.g., $V_{BE2}$) and the base-to-emitter voltage of Q1 (e.g., $V_{BE1}$) over $rs_1$ (e.g., $(V_{BE2}-V_{BE1})/rs_1)$) produces a fixed amount of current in both M3 and M4. For example, for a bipolar transistor, $V_{BE}=V_T \text{ Ln}(I_C/I_S)$ in which $V_T$ is thermal voltage, $I_S$ the saturation current, and $I_C$ is the collector current. By proper design of the circuit, M4 and M3 are set to have similar sizes and operate in the saturation regime and operational amplifier 102 is in a negative feedback loop. This will ensure that their drain currents remain the same and equal to $I_C$. According to Kirchhoff's Voltage Law (KVL), the input terminal of the operational amplifier 102 leads to $(V_{BE1}-V_{BE2})=rs_1I_C$. If Q2 is m times larger than Q1 (e.g., Q1 is 1 transistor and Q2 is m parallel transistors), then $(V_{BE1}-V_{BE2})=V_T \text{Ln}(mI_{C1}I_{S2}/I_{C2}I_{S1})$ and since $I_{C1}=I_{C2}$ and $I_{S1}=I_{S2}$, this leads to $I_{C1,2}=V_T \text{Ln}(m)/R$. The current at M3 or M4 is then copied to device M5, which flows through resistor RS2 and BJT Q3. The output voltage at the node n3 is the base-to-emitter voltage of BJT Q3 (e.g., $V_{BE3}$) plus the resistance of resistor RS2 (e.g., $rs_2$) times the current at node n3 (e.g., $I_3$), or $V_{ref}=V_{BE3}+rs_2I_3$.

While the conventional approaches, such as circuit 100, may compensate for temperature and supply voltage and produce a stable DC voltage, the conventional approaches suffers from various technical problems, particularly with respect to sensitivity to process induced variations and requiring larger physical chip real-estate requirements. That is, BJTs are generally large transistors that require physical space on the chip, which translates to larger overall IC size. Furthermore, traditionally BJTs exhibit increased variations in process due to manufacturing tolerances, thereby increasing the sensitivity of conventional circuitry to process induced variations. These increased variations must be compensated for in designing the conventional circuit, which translates to increased circuit complexity and/or reduction in PVT variation ranges for which the conventional circuit is insensitive too. While process induced variations may be addressed by trimming the IC (e.g., calibrating to account for process variations), such operations are an additional step that takes time and resources to perform.

A further technical problem associated with the conventional designs is that they require a high minimum supply voltage to operate the circuit. For example, referring to circuit 100, the minimum supply voltage VDDQ is based on the overhead voltages of device M3 and BJT Q2 to ensure that both devices operate in saturation region and pass current through the circuit 100. Accordingly, the supply voltage VDDQ must be $V_{BE2}$ plus the overdrive voltage of M3 (e.g., $V_{OV3}$) at a minimum, otherwise device M3 and/or BJT Q2 may turn off. As an illustrative example, for the circuit 100, $V_{BE2}$ may be 0.7-0.8 volts and $V_{OV3}$ may be approximately 200 millivolts. Thus, the minimum supply voltage VDDQ required for circuit 100 is around 0.9 V to 1 V, otherwise the circuit 100 would not function.

Further still, the conventional designs are capable of generating only a single, fixed reference voltage that is stable with respect to designed temperature ranges. That is, the conventional designs can only output one voltage level, and if the voltage level is adjusted the output voltage would no longer be stable with respect to temperature. For example, solving $V_{ref}=V_{BE3}+rs_2I_3$ of FIG. 1 with respect to temperature and taking the derivative of the output voltage with respect to temperature returns a single optimal output voltage. That is, due to operating conditions of BJTs, the circuit 100 is only stable with respect to temperature for a single, fixed output reference voltage. Other output voltages that deviate from the optimal voltage would result in fluctuations with temperature changes according to the physical characteristics of the BJTs.

Accordingly, embodiments of the disclosed technology relate to an improved reference voltage generator and corresponding circuit implementation and method of operation that achieve improved stability for PVT variations and reduced physical dimensions compared to existing reference voltage designs. More specifically, and as will be described in more detail later in this disclosure, embodiments disclosed herein utilize complementary metal-on-silicon (CMOS) field-effect transistors (FETs) to generate a stable DC reference voltage, which is several orders of magnitude smaller in on chip real estate than BJTs used in the conventional designs. As a result, the embodiments disclosed herein are physically smaller and subject to reduced process induced variation, as MOSFETs are generally easier to produce and can be manufactured to tighter tolerance providing less variation between components. This enables the embodiments disclosed herein to achieve improved stability in terms of PVT variations, thereby providing a technical improvement over the existing design.

Additionally, the embodiments disclosed herein are capable of operation at a minimum supply voltage substantially less than the minimum supply voltage required in the conventional bandgap designs. For example, because the gate-to-source bias voltage ($V_{GS}$) required for MOSFETs to function is less than the $V_{BE}$ of BJTs, the minimum supply voltage required to turn on the electrical components included in the embodiments disclosed herein is less than that of the conventional designs. This enables the embodiments disclosed herein to consume less power as compared to at least the conventional bandgap designs, thereby providing another technical improvement over the existing designs.

Furthermore, the embodiments disclosed herein are capable of providing an adjustable output reference voltage that is stable with respect to PVT variations. For example, due to the physical properties of MOSFETs and the dynamics of how temperature impacts the operation thereof, as detailed below, the output reference voltage may be provided at multiple different voltage levels by the embodiments disclosed herein while maintaining the stability with respect to PVT variations. This provides yet another technical improvement over existing cross-coupled level shifters.

There are some existing approaches that employ CMOS transistors to generate a stable DC reference voltage. These approaches operate the CMOS transistors in a subthreshold region to save power, which will lead to significant process-induced variations that will necessitate calibration (e.g., trimming of the circuit). Furthermore, the temperature ranges of for which stability could be achieved is limited (e.g., 10° C.-70° C. in some cases). Whereas, the embodiments disclosed herein provide for stable DC reference voltage generation using CMOS transistors that are operated in the saturation region. As will be detailed below, the embodiments disclosed herein achieve improved TC and line regulation, across all process corners without requiring calibration. Calibration is possible for the embodiments disclosed herein which will provide increased improvements in terms of stability across larger temperature ranges and supply voltages.

Figure 2:
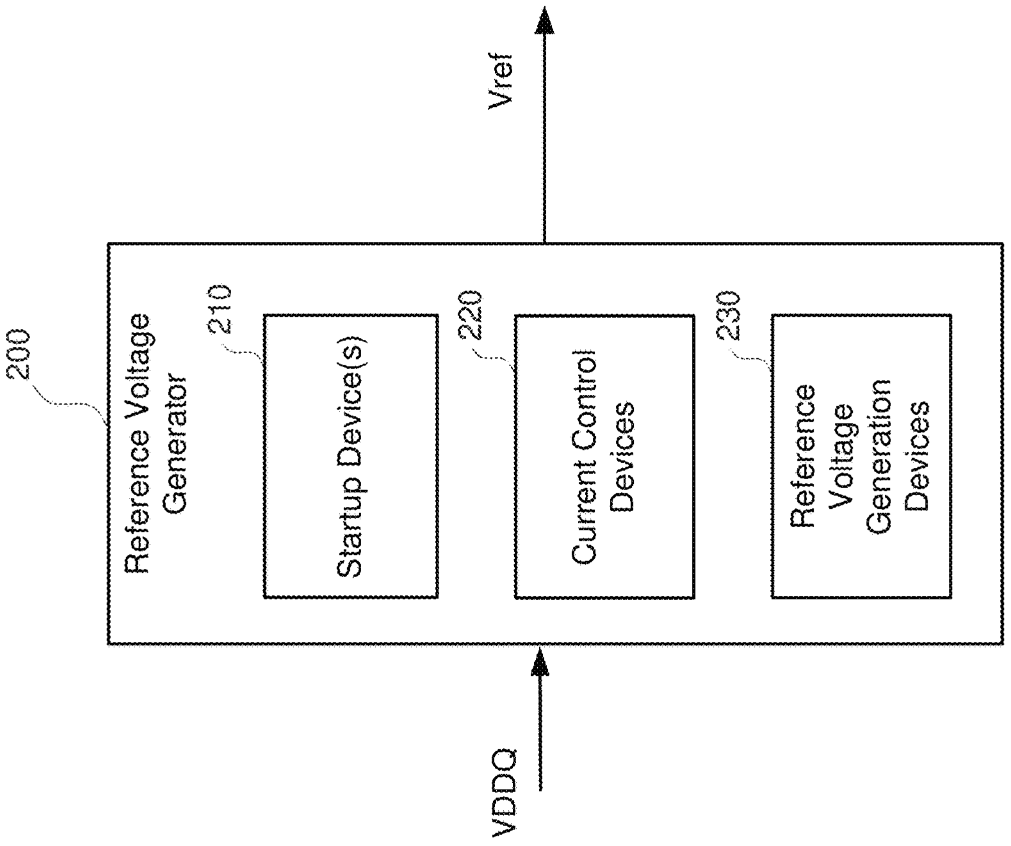
FIG. 2 is a block diagram of a reference voltage generator according to embodiments of the disclosed technology.

FIG. 2 is a block diagram of a reference voltage generator 200 for generating a stable DC reference voltage that is relatively insensitive to PVT variations according to embodiments of the disclosed technology. The insensitivity required by reference voltage generator 200 is application specific and based no design, generally the more insensitive (e.g., smaller TX and regulations) the better. The reference voltage generator 200 is configured to generate an output voltage $V_{ref}$ that is stable over a range of temperatures, for a range of supply voltages, across a plurality of process corners. For example, embodiments provide an output voltage that is insensitive to temperature variations between −40 and 140° C., supply voltage variations between 1V and 1.3V, across all process corners.

Figure 7A:
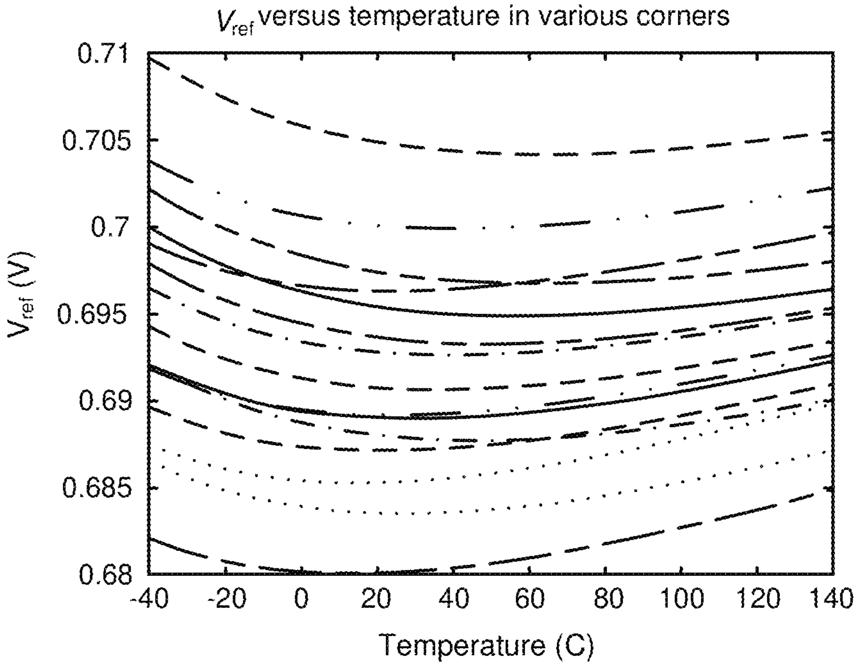
FIGS. 7A and 7B are examples plots illustrating stability, with respect to PVT variations, of an output reference voltage from a reference voltage generator according to embodiments of the disclosed technology.

For example, the range of temperatures may be representative of ambient an environmental temperatures that the reference voltage generator 200 (also referred to herein as a reference voltage generator circuit) is exposed to throughout operation. Over such a range (for example, −40° C. to 140° C.), the reference voltage generator 200 is outputs a voltage $V_{ref}$ that exhibits minimal variations. That is, within the temperature range, the output voltage varies only within an acceptable voltage levels. For example, FIG. 7A provides an illustrative example of output voltage $V_{ref}$ as a function of temperature according to embodiments disclosed herein.

Similarly, the reference voltage generator 200 may be exposed to fluctuations in supply voltage. For example, the supply voltage may fluctuation from 106% to 97% of the designed for supply voltage due to circuity external to the reference voltage generator 200 sinking or sourcing current form the supply. As such, the reference voltage generator 200 is configured to generate an output voltage that is relatively insensitive to these fluctuations, for example, as illustratively shown in FIG. 7B. While the reference voltage generator 200 may be designed for a certain supply voltage, embodiments herein may operate on less than the designed for supply voltage. For example, the reference voltage generator 200 may be designed for nominal supply voltage of 1.1V (thus insensitive for supply voltages between 1 and 1.3V), but nonetheless be able to function from a supply voltage of 0.65V or more.

Furthermore, process induced variations in the electrical components that make up the reference voltage generator 200 may provide for variations in electrical properties between physical implementations of the reference voltage generator 200. For example, variations in physical properties of electrical components due manufacturing tolerances (e.g., semiconductor doping levels and concentrations, device sizes, etc.) may translate to differences between each real world physical implementation of the reference voltage generator 200. For example, dopant concentration of transistors may fluctuate within manufacturing tolerances that may translate to differences in threshold voltages, which can impact the operation of the reference voltage generator 200. The process induced variations are characterized as a plurality of process corners for each electrical component, for example, a fast (F), slow (S), and typical (T) corner. Each device has its own corners, and when the components are combined into a single circuit the number of corners increases to cover all variations. For example, an n-channel MOSFET (nMOS) transistor may have F, S, and T corners and a p-channel MOSFET (pMOS) may also have a F, S, and T corners. Across both nMOS and pMOS there would be FF, FS, FT, SF, ST, SS, TT, TS, and TF corners. In the embodiments disclosed herein, there may be 15 process induced corners, and the reference voltage generator 200 is configured to generate an output voltage that is relatively stable across all 15 process corners.

The reference voltage generator 200 according to embodiments disclosed herein includes startup device(s) 210, current control devices 220, and reference voltage devices 230. The startup device(s) 210 (also referred to herein as a startup circuit) may include one or more electrical components configured to remove degenerate points within the reference voltage generator 200, as well as reduce startup time by decreasing time period of the reference voltage generator 200 to settle responsive to ramping up a supply voltage VDDQ. For example, the startup device(s) 210 may be coupled to the current control devices 220 and reference voltage generation devices 230 at a node. The startup device(s) 210 is configured to activated responsive to receiving the supply voltage VDDQ and operate to charge the node to a non-zero current (e.g., non-degenerate point). Once charged (e.g., the output voltage $V_{ref}$ stabilizes), the startup device(s) 210 is deactivated and draws minimal to zero current.

Without the startup device(s) 210, there are at least two points that the reference voltage generator 200 may stabilize such that the reference voltage generator 200 will operate as designed. Once such point is where all electrical components of the reference voltage generation devices 230 have a the same current, and the second where there is zero current passing in reference voltage generation devices 230. However, if the reference voltage generation devices 230 have zero current, then the reference voltage generator 200 would not output any voltage. This point of zero current is referred to herein as the degenerate point. Thus, the startup devices 210 function to force the current in the reference voltage generation devices 230 to the optimum point having non-zero current to ensure proper operation after the settling period.

The current control devices 220 (also referred to herein as a current control circuit) may include a plurality of electrical components, which are configured to feed current into the reference voltage generation devices 230. The current control devices 220 are configured to mirror the current at different nodes coupled to reference voltage generation devices 230 so that voltage levels at each node can be properly maintained.

The reference voltage generation devices 230 (also referred to herein as a reference voltage generation circuit) includes a plurality of electrical components configured to generate the stable DC output voltage $V_{ref}$. For example, as will be described below, the reference voltage generation devices 230 comprises CMOS transistors, with one CMOS on a first branch of the reference voltage generation devices 230 and a second CMOS on a second branch of the reference voltage generation devices 230. The current control devices 220 function to ensure current in each of the first and second branches are approximately equal. The closer to equal, the better in terms of stable voltage generation. Furthermore, the CMOS transistors have dissimilar threshold voltages. For example, one CMOS transistor has a threshold voltage that is higher than the threshold voltage of the complimentary transistor. This dissimilarity in the threshold voltage, along with the mirroring of the current at each branch, causes the CMOS transistors to pass a current to an output node that is dependent on a difference between threshold voltages, which generates output voltage $V_{ref}$ that is dependent on resistance between the CMOS transistors and the output node and the passed current.

Accordingly, the reference voltage generator 200 provides various technical advantages over the conventional bandgap voltage reference circuits. For example, the reference voltage generator 200 does not use any BJTs, using CMOS transistors instead. Accordingly, embodiments disclosed herein are more compact (e.g., require less physical space) than the conventional bandgap voltage reference circuits. Additionally, embodiments disclosed herein exhibit less process induced variation, as MOSFETS are generally easier to produce and can be manufactured to tighter tolerance providing less variation between components. Furthermore, the embodiments disclosed herein operate at a minimum supply voltage that is substantially less than the supply voltage required by conventional bandgap voltage reference circuits. For example, as noted above, circuit 100 requires a minimum supply voltage of around 0.9 V (e.g., $V_{BE2}$ of 0.7-0.8 V and $V_{OV3}$ of 0.2 V to remain in the saturation region). Whereas, the embodiments herein require approximately 0.3 V less, because the supply voltage required to maintain saturation of the CMOS transistors may be approximately 0.4 V instead of 0.7-0.8 required by the BJTs.

Further still, the output reference $V_{ref}$ generated by reference voltage generator 200 may be tunable, such that a stable DC output voltage $V_{ref}$ may be generated at multiple different voltage levels that are respect to PVT variations. For example, because the reference voltage generator 200 is implemented using MOSFETs instead of BJTs, the dynamics temperature impacting the operation of the reference voltage generator 200 are based on a different physical properties and operating principles as compared to BJTs. The difference in temperature dynamics is discussed below with reference to Eq. 2-14.

Figure 3A:
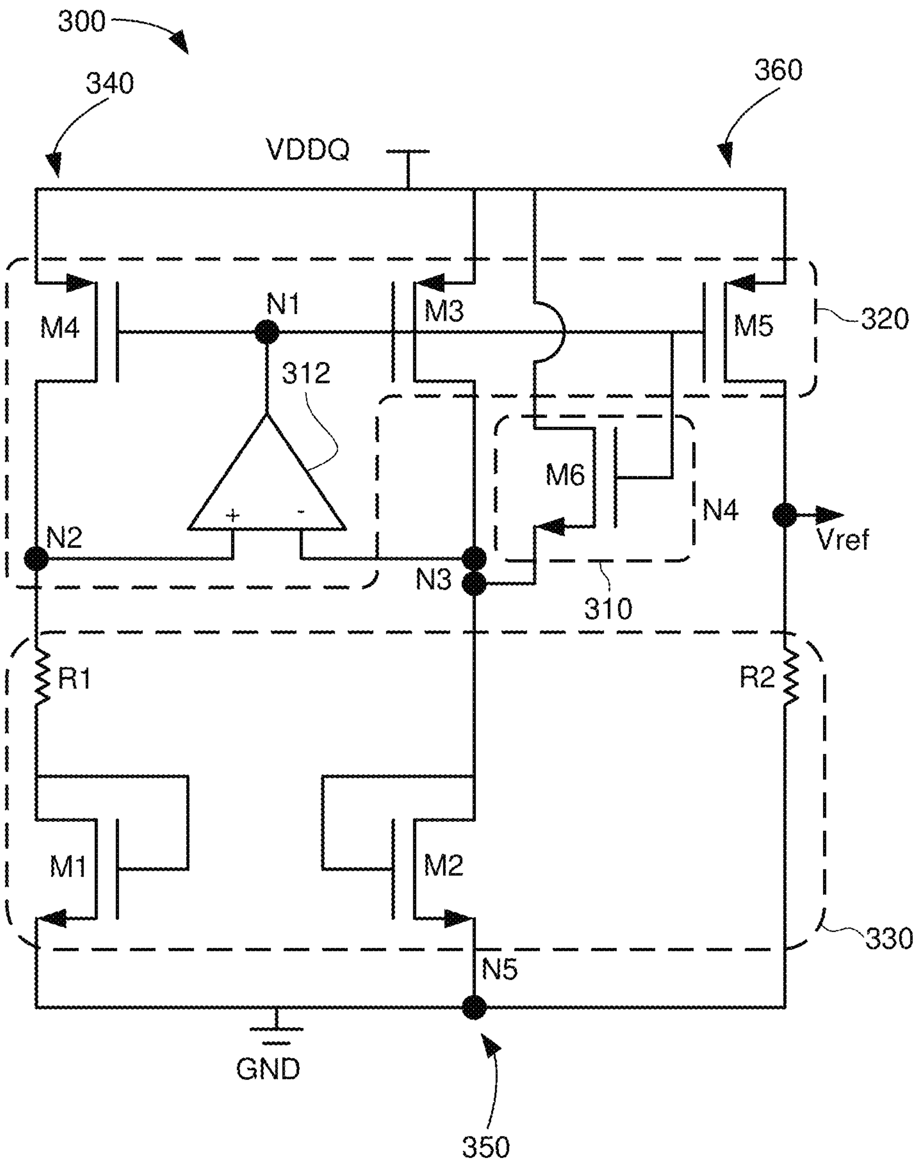
FIGS. 3A and 3B depict example circuit implementations of a reference voltage generator according to embodiments of the disclosed technology.
Figure 3B:
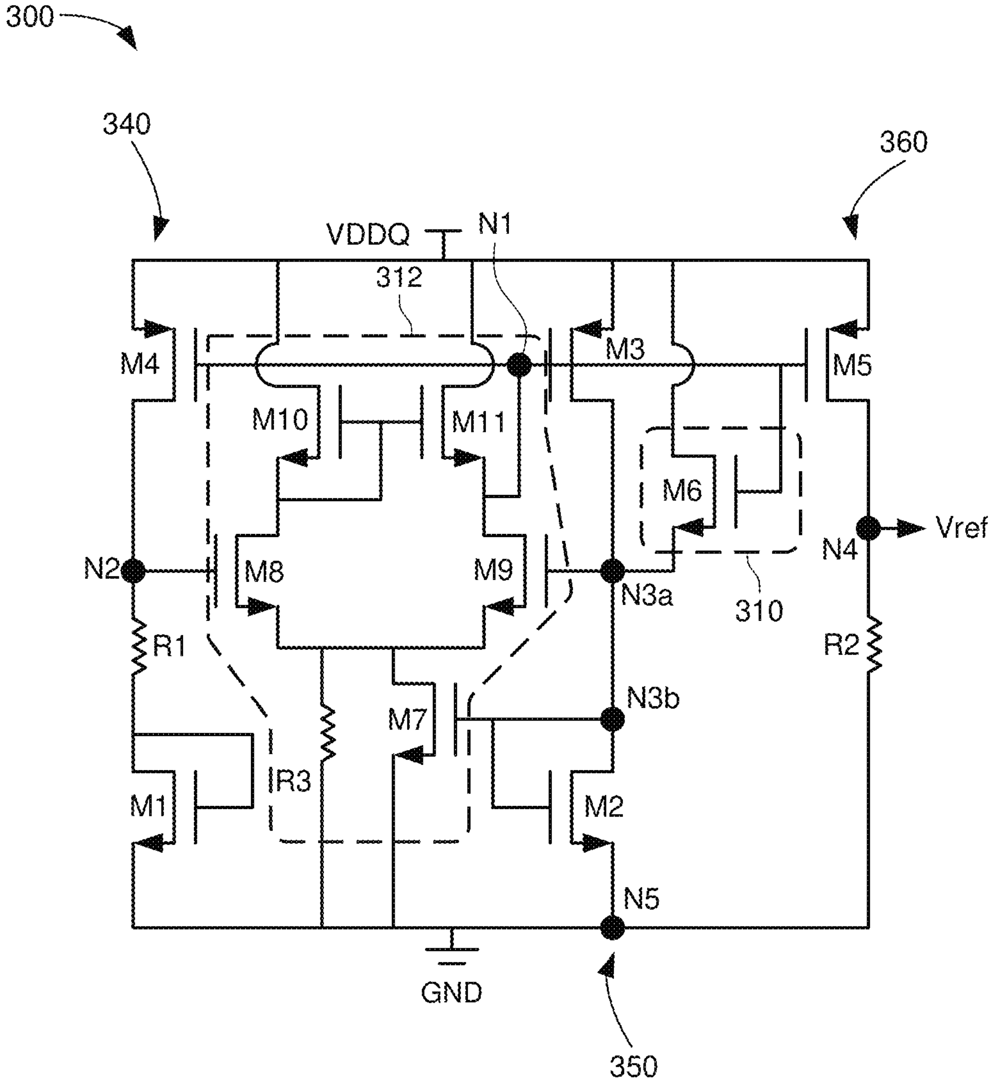
Figure 4:
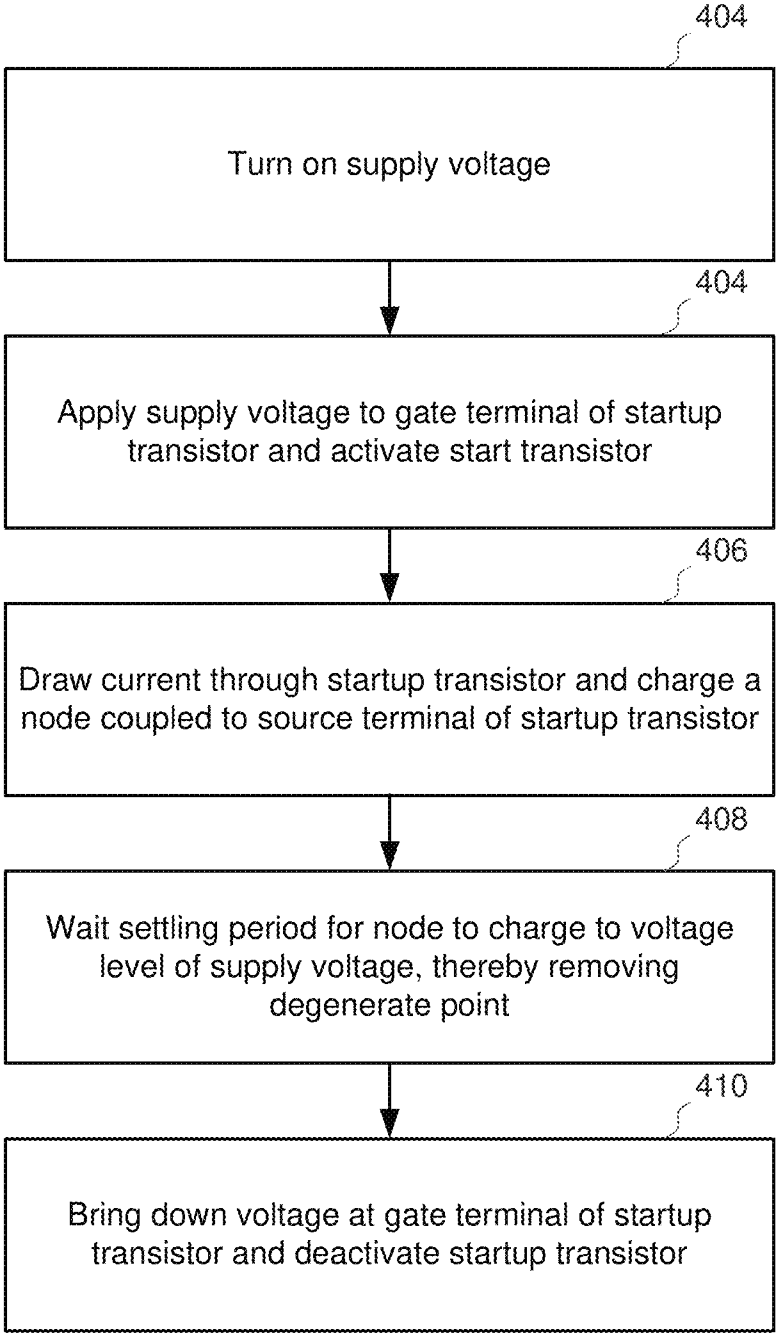
FIGS. 4 and 5 are flowcharts depicting methods of operation of the reference voltage generator of FIGS. 3A and 3B according to embodiments of the disclosed technology.
Figure 5:
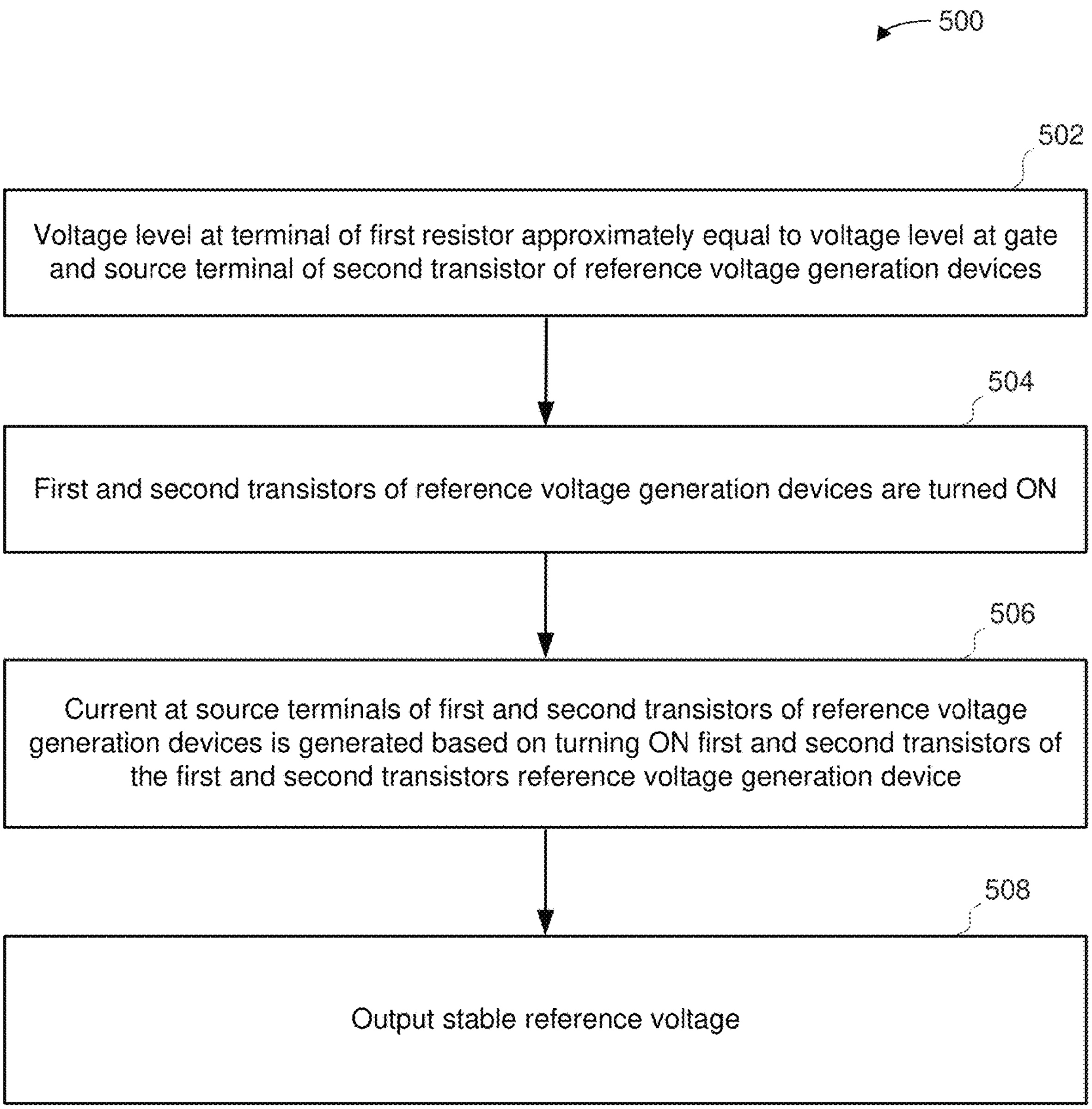

FIGS. 3A and 3B depict an example circuit implementation 300 of the reference voltage generator 200 according to embodiments of the disclosed technology. FIGS. 4 and 5 are flowcharts depicting example methods 400 and 500 of operation of the reference voltage generator 200 according to embodiments of the disclosed technology. The methods 400 and 500 will be described hereinafter in the context of the example circuit implementation 300 depicted in FIG. 3A.

Referring to FIGS. 3A and 3B, the circuit 300 includes startup devices 310, current control devices 320, and reference voltage generation devices 330, each of which span one or more of first branch 340, second branch 350, and third branch 360. The circuit 300 comprises a plurality of MOS field-effect transistors (MOSFETs) that are included as part of startup devices 310, current control devices 320, and reference voltage generation devices 330. FIG. 3B depicts the example circuit 300, with the operational amplifier 312 shown as various internal electrical components that make up the operational amplifier 312 and node N3 separated into node N3*a* and node N3*b*. For example, the operational amplifier 312 comprises a plurality of n-channel MOSFET (nMOS transistors) shown as transistors M7-M11 and a resistor R3, which together function as the operational amplifier 312.

The current control devices 320 may be example circuitry for implementing current control devices 220 of FIG. 2 and includes operational amplifier 312 and transistors M3, M4, and M5, which may be p-channel MOSFET (pMOS transistors) or another suitable semiconductor device. As shown in FIGS. 3A and 3B, source terminals of transistors M3, M4, and M5 are connected to supply voltage VDDQ and each gate terminal is coupled to an output terminal of the operational amplifier 312. Drain terminals of transistors M3 and M4 are coupled to negative and positive input terminals of the operational amplifier 312 via nodes N2 and N3, respectively. As used herein, the term "coupled with" may refer to directly coupled with or indirectly coupled through one or more intervening components. Similarly, "connected to" may refer to direct or indirect connection. As described above with reference to FIG. 2, the current control devices 320 function to ensure the current at node N2 is mirrored at node N3 and that the current at the source terminal of transistor M2 is mirrored at the drain terminal of transistor M5. Particularly, the transistors M4 and M3, in conjunction with operational amplifier 312, function to force current at node N2 in the first branch 340 to be mirrored at node N3 in the second branch 350, and vice versa. Moreover, transistor M5 also mirrors the current at the source terminal of transistor M3 and flows the current to resistor R2.

The startup devices 310 may be example circuitry for implementing startup devices 210 of FIG. 2 and includes transistor M6, which be a n-channel MOSFET (nMOS transistors) or another suitable semiconductor device. As shown in FIG. 3A, a gate terminal of transistor M6 is coupled to the output terminal of the operational amplifier 312 along with the gate terminals of transistors M3, M4, and M5, while the drain terminal of transistor M6 is connected to the supply voltage VDDQ and the source terminal is coupled to node N3. In an example implementation, the gate terminal of transistor M6 may be directly coupled to the output terminal of the operational amplifier 312 along with the gate terminals of transistors M3, M4, and M5, while the drain terminal of transistor M6 may be directly connected to the supply voltage VDDQ and the source terminal may be directly coupled to node N3. As described above with reference to FIG. 2, the startup devices 310 function to remove the degenerate point by charging the node N3 upon startup or reset (e.g., when the supply voltage is activated).

While the example implementation of the startup devices 310 includes one transistor M6, this is merely an illustrative example and other implementations are possible. For example, startup devices 310 and/or 210 may be implemented as a plurality of electrical devices such as transistors, resistors, capacitors, etc. However, such implementations may increase the size of the circuit thereby requiring increased on chip real-estate.

The reference voltage generation devices 330 may be example circuitry for implementing reference voltage generation devices 230 of FIG. 2 and includes first resistor R1, second resistor R2, and CMOS transistors M1 and M2 (referred to herein as first and second transistors, respectively), which be nMOS transistors or other suitable semiconductor device. A first terminal of first resistor R1 is coupled to node N2 and a second terminal of the first resistor R1 is coupled to the drain terminal and gate terminal of transistor M1. Drain terminal and gate terminal of second transistor M2 are coupled to node N3. Source terminals of transistors M1 and M2 are coupled to ground GND, as well as a first terminal of second resistor R2. Drain terminal of transistor M5 is coupled to a second terminal of second resistor R2 at node N4, from which a reference voltage $V_{ref}$ is generated.

As an illustrative example, the first terminal of first resistor R1 may be directly coupled to node N2 and the second terminal of the first resistor R1 may be directly coupled to the drain terminal and gate terminal of transistor M1. Drain terminal and gate terminal of second transistor M2 may be directly coupled to node N3. Source terminals of transistors M1 and M2 may be directly coupled to each other and coupled to ground GND. The first terminal of second resistor R2 may be directly to the source terminals of transistors M1 and M2. Drain terminal of transistor M5 may be directly coupled to the second terminal of second resistor R2.

As described above with reference to FIG. 2, the reference voltage generation devices 330 are provided to control the output voltage at node N4. That is, the reference voltage generation devices 330 are provided and current applied thereto that generates an output voltage $V_{ref}$ that is stable to PVT variations, for example, as described with reference to the results shown in FIGS. 7A-8C. Particularly, due to the threshold voltage of first transistor M1 ($V_{th1}$) that is dissimilar to that of second transitory M2 ($V_{th2}$), an output voltage can be provided that is relatively insensitive to PVT variations. For example, transistor M1 may have a low threshold voltage $V_{th1}$, while transistor M2 may have a high threshold voltage $V_{th2}$. That is, $V_{th1}$ is less than $V_{th2}$. In an illustrative example, $V_{th2}$ may be approximately 50 millivolts to 100 millivolts. By providing transistors M1 and M2 such that $V_{th1}$ is less than $V_{th2}$ and due to threshold voltages of both transistors have similar temperature dependency, a stable $V_{ref}$ can be achieved. Embodiments herein require at least a dissimilarity between threshold voltages of transistors M1 and M2, while the other transistors of circuit 300 may have any threshold voltage desired. In various embodiments, transistors M3, M4, and M5 instances of substantially the same transistors. That is, transistors M3, M4, and M5 may be transistors having the same or approximately the same physical properties, such as, each transistor may be approximately equal in size, length, width, and threshold voltage. Improvement in stability can be achieved as the physical properties of M3, M4, and M5 become closer to being the same.

Referring now to FIG. 4, method 400 depicts a flowchart for removing a degenerate point of the circuit 300, via the startup devices 310, according to embodiments of the disclosed technology. Prior to turning on the supply voltage VDDQ, the current in the circuit 300 is zero and the voltage at node N3 is zero. After the supply voltage VDDQ is ramped up, if the circuit 300 remains at the degenerate point, the node N3 tracks the supply voltage and node N3 remains grounded so that the currents in all three branches remain close to zero. Responsive to the supply voltage being turned on, at block 402, the supply voltage VDDQ is applied to the gate terminal of transistor M6 (also referred to herein as startup transistor) at block 404. As the voltage applied to the gate terminal of transistor M6 ramps up from low voltage level at GND to the supply voltage level VDDQ, the gate-to-source bias voltage ($V_{GS}$) (e.g., voltage at the gate terminal is VDDQ and voltage at the source terminal is zero) of M6 is brought up in excess of the threshold voltage of transistor M6, which turns transistor M6 ON (e.g., activate). Responsive to turning transistor M6 ON, transistor M6 draws current through its drain terminal, which charges node N3 to the supply voltage level VDDQ, at block 406. Once node N3 is charged (e.g., after a settling period during which the node N3 is charged), the voltage at node N3 goes up forcing the current at node N3 to a non-zero current, thereby removing the degenerate point (e.g., zero current as explained above in connection with FIG. 2) at block 408. Further, the node N2 is also charged due to current mirroring from transistor M4, for example, when node N1 goes down, transistor M4 sources current to node N2, which charges node N2 forcing the current at node N2 to be the non-zero current flowing through node N3. Also during a settling period, the voltage at the gate terminal of transistor M4 (e.g., at node N1) is brought down, due to the negative feedback action by the operational amplifier 312 until the voltage stabilizes at nodes N2 and N3.

After the settling period, at block 410, the voltage at the gate terminal of transistor M4 is less than the supply voltage level VDDQ such that $V_{SG}$ of M4 is approximately 150 millivolts above its absolute threshold voltage. The gate terminal of transistor M6 is also brought down, which causes the $V_{GS}$ of transistor M6 to be reduced well below its threshold voltage, thereby turning transistor M6 OFF (e.g., deactivate). As such, after the settling period, negligible current flows through transistor M6 and the circuit 300 operates to generate a PVT insensitive output voltage, for example, as described in connection with FIG. 5.

Referring now to FIG. 5, method 500 depicts a flowchart for generating a PVT insensitive reference voltage, according to embodiments of the disclosed technology. At block 502, voltage level at node N2 (e.g., at first terminal of resistor R1) is approximately the same as voltage level at node N3 (e.g., at gate and drain terminals of transistor M2). This condition is enforced by providing transistors M4 and M3 that are substantially the same, as well as both transistors being coupled to the output terminal of the operational amplifier 312. Since the source terminals of both transistors M3 and M4 are coupled to the supply voltage, the current at the source terminal is the same. Furthermore, the gate terminal of transistors M3 and M4 are coupled to the output terminal of the operational amplifier 312 via node N1, thus the $V_{GS}$ of both transistors M3 and M4 will be approximately the same. As a result, the transistors M3 and M4 are forced to have the same current passing therethrough. The operational amplifier 312 then functions to ensure that the voltage level at node N2 is approximately the same as the voltage at node N3, for example, due to negative feedback operations in the operational amplifier 312. As such, the current at nodes N3 and N2 will be approximately the same.

At block 504, the first and second transistors M1 and M2 are turned ON based on voltage levels at node N2 and node N3, respectively. For example, a voltage is applied to the gate terminal of transistor M1 that brings up the gate-to-source bias voltage of transistor M1 ($V_{GS1}$) above its threshold voltage ($V_{th1}$), thereby turning the transistor M1 ON. Similarly, a voltage is applied to the gate terminal of transistor M2 that brings up the gate-to-source bias voltage of transistor M2 ($V_{GS2}$) above its threshold voltage ($V_{th2}$), thereby turning the transistor M2 ON. Accordingly, as alluded to above, the minimum supply voltage VDDQ required for circuit 300 to operate is $V_{GS2}$ plus $V_{OV3}$ (e.g., overdrive voltage of transistor M3 to maintain transistors M3-M5 in saturation). $V_{GS2}$ controls the minimum supply voltage because of the higher $V_{th2}$, thus a larger $V_{GS2}$ (relative to $V_{GS1}$) is required to ensure both transistors M1 and M2 are activated. Furthermore, while $V_{OV3}$ is illustrated here, the minimum supply voltage could be based on $V_{OV3}$, $V_{OV4}$, or $V_{OV5}$ because each of M3-M5 may have approximately the same physical properties (e.g., withing manufacturing tolerances), and would therefore have the same $V_{OV}$. In an illustrative example, $V_{GS2}$ may be 300 mV and $V_{OV}3$ may be 200 mV as noted above.

At block 506, current at node N5 (e.g., current $I_5$ at source terminals of transistors M1 and M2) is generated based on transistors M1 and M2 turning ON. The current at node N5 is determined based on $V_{GS2}$ and $V_{GS1}$, along with the resistance levels $r_1$ and $r_2$ of resistors R1 and R2, respectively. Furthermore, $V_{GS2}$ of transistor M2 and $V_{GS1}$ of transistor M1 are dependent on the current at nodes N3 and N2, respectively. For example, the current passing through transistor M2 in branch 340 from node N3 is applied to the drain and gate terminals of transistor M2. As a result, the voltage at the drain terminal of transistor M2 will be $V_{GS2}$. Because the current at node N2 and node N3 are the same, the voltage at node N2 will be $V_{GS2}$ and the voltage at node N3 will be $V_{GS1}$. Thus, the voltage drop across resistor R1 is the difference between $V_{GS2}$ and $V_{GS1}$ and the curren $I_5$ at node N5 will be the ratio of the difference of $V_{GS2}$ and $V_{GS1}$ over the resistance $r_1$ of resistor R1 (e.g., $I_5=(V_{GS2}-V_{GS1}/r_1)$.

The current applied to the source terminal of transistor M5 is approximately the same as that at the source terminal of transistors M3 and M4. This condition flows from transistor M5 being substantially the same and having approximately the same physical properties (e.g., size, width, length, and threshold voltage) as transistors M3 and M4. As a result, at block 508, the voltage level generated at node N4 (e.g., at the second terminal of the resistor R2) will be the current $I_5$ times the resistance $r_2$ of resistor R2. Thus, the output voltage $V_{ref}$ is provided as follows:

$$V_{ref} = r_2 I_5 = \frac{r_2}{r_1}(V_{GS2} - V_{GS1}) \quad \text{Eq. 1}$$

Due to the threshold voltage of both transistors M1 and M2 having similar temperature dependency and resistors R2 and E1 having similar temperature dependency, the output voltage becomes temperature independent.

To achieve insensitivity to PVT variations, the derivative of the output voltage $V_{ref}$ with respect the temperature $(V_{ref}/\delta T)$, which is dependent on $V_{GS1}$ and $V_{GS2}$, should be minimized. For example, to minimize the gradients, the partial derivative of $V_{ref}$ with respect to temperature (T) is forced to zero (e.g., $\delta V_{ref}/\delta T=0$), which means that the partial derivative of the difference between $V_{GS1}$ and $V_{GS2}$ (e.g., $\Delta V_{GS2,1}$) with respect to T is forced to zero (e.g., $\delta\Delta V_{GS2,1}/\Delta T=0$) and that $I_5$ satisfies the following condition:

$$I_5=I_0/(1+\alpha_R\Delta T) \quad \text{Eq. 2}$$

Where $I_0$ represents the current at room temperature (e.g., 27° C.), $\alpha_R$ represents a temperature coefficient of the resistor R2, and $\Delta T$ represents the difference in temperature between the operating temperature of the circuit 300(T) and room temperature $(T_0)$ (e.g., $\Delta T=T-T_0$).

Using square law approximation:

$$\Delta V_{GS2,1}=\Delta V_{th2,1}+\sqrt{2I_5\beta_2}-\sqrt{2I_5\beta_1}=\Delta V_{th2,1}+\sqrt{2I_5}(\sqrt{1/\beta_2}-\sqrt{1/\beta_1}) \quad \text{Eq. 3}$$

Where $\Delta V_{th2,1}$ is the difference in threshold voltages of transistor M2 $(V_{th2})$ and transistor M1 $(V_{th1})$. As noted above, $V_{th2}$ is higher than $V_{th1}$. The coefficient $\beta$ for each transistor M1 and M2 (e.g., $\beta_1$ pond $\beta_2$, respectively) is provided as:

$$\beta = \frac{\mu_n C_{ox} W}{L} \quad \text{Eq. 4}$$

$$\beta_{eff} = \mu_n C_{ox} \quad \text{Eq. 5}$$

Figure 6A:
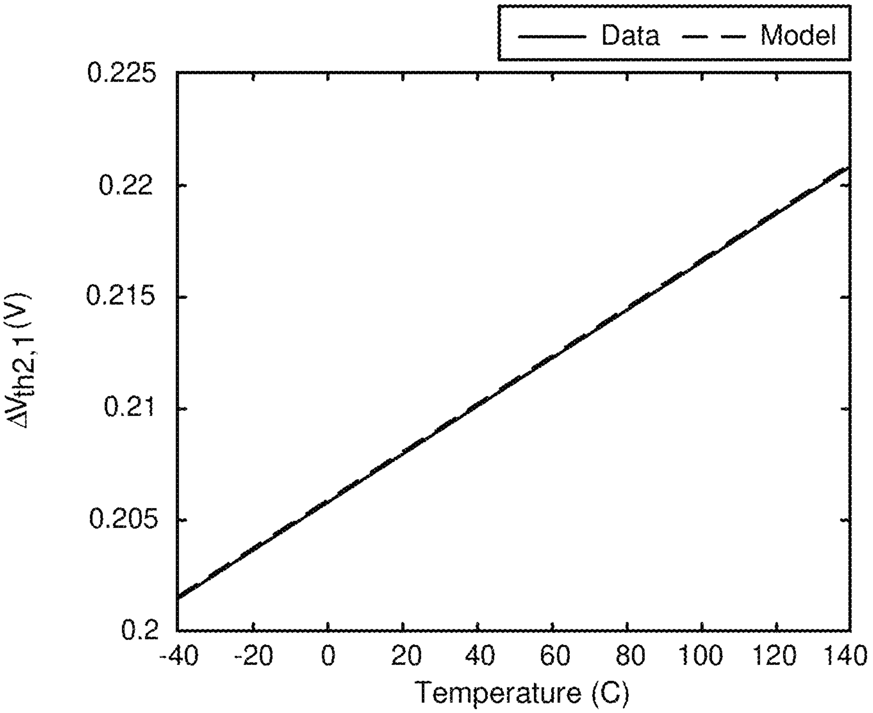
FIGS. 6A-6C illustrate example plots of simulations and models of parameters for obtaining zero temperature coefficient conditions according to embodiments of the disclosed technology.
Figure 6B:
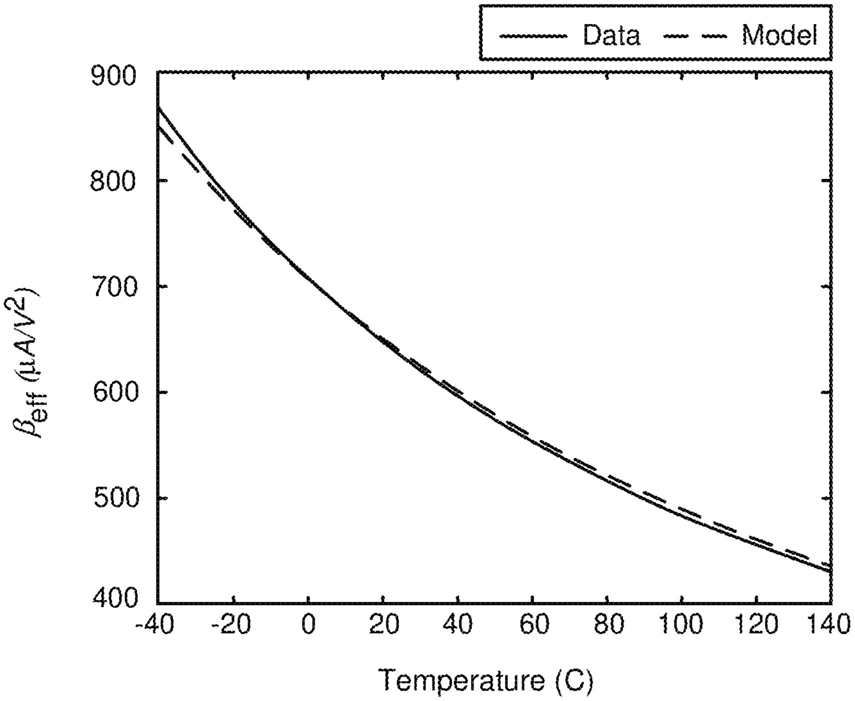

$\beta_{eff}$ is a coefficient whose behavior with respect to temperature is shown in FIG. 6B. Where L is representative of the length of a given transistor, W is representative of the width of a given transistors, $\mu_n$ is representative of carrier mobility of a given nMOS transistor (e.g., electron mobility in the case of nMOS transistors), and $C_{ox}$ is representative of gate-oxide capacitance of given transistor. From Eqs. 3, 4, and 5, the difference in gate-to-source bias voltage between transistor M2 and M1 (e.g., $\Delta V_{Gs2,1}$) simplifies to:

$$\Delta V_{GS2,1}=\Delta V_{th2,1}+\sqrt{2I_5/\beta_{eff}}(\sqrt{L_2/W_2}-\sqrt{L_1/W_1}) \quad \text{Eq. 6}$$

Where L1 and W1 are the length and width of transistor M1 and $L_2$ and $W_2$ are the length and width of transistor M2. By defining a variable N as follows:

$$N=\sqrt{2}(\sqrt{L_2/W_2}-\sqrt{L_1/W_1}) \quad \text{Eq. 7}$$

The difference in the gate-to-source bias voltage between transistor M2 and M1 is:

$$\Delta V_{GS2,1}=\Delta V_{th2,1}+N\sqrt{I/\mu_n C_{ox}} \quad \text{Eq. 8}$$

Next temperature equations for MOSFETs can be substituted into Eq. 8 to obtain:

$$\Delta V_{GS2,1}=\Delta V_{th0}(1+\alpha_{\Delta V_{th}}\Delta T)+N\sqrt{I_0(1+\alpha_\mu\Delta T)/(1+\alpha_R\Delta T)\beta_{eff,0}} \quad \text{Eq. 9}$$

$$\Delta V_{GS2,1}=\Delta V_{th0}(1+\alpha_{\Delta V_{th}}\Delta T)+N\sqrt{I_0/\beta_{eff,0}}\sqrt{(1+\alpha_\mu\Delta T)/(1+\alpha_R\Delta T)} \quad \text{Eq. 9}$$

Where a $\alpha_{\Delta V_{th}}$ is representative of a temperature coefficient of the difference between threshold voltages of transistors M1 and M2 and a $\alpha_\mu$ is representative of temperature coefficient of the carrier mobility (e.g., electron mobility of nMOS implementations of transistors M1 and M2).

Using Taylor expansion series and neglecting the second order terms, the temperature dependent factor in the second term simplifiers to:

$$\sqrt{(1+\alpha_\mu\Delta T)/(1+\alpha_R\Delta T)} \sim \left(1+\frac{\alpha_\mu\Delta T}{2}\right)\left(1-\frac{\alpha_R\Delta T}{2}\right) \sim \left(1+\frac{(\alpha_\mu-\alpha_R)\Delta T}{2}\right) \quad \text{Eq. 11}$$

Second order terms are neglected in Eq. 11 because they do not impact the analysis in a significant way, and removing them simplifies the analysis.

Figure 6C:
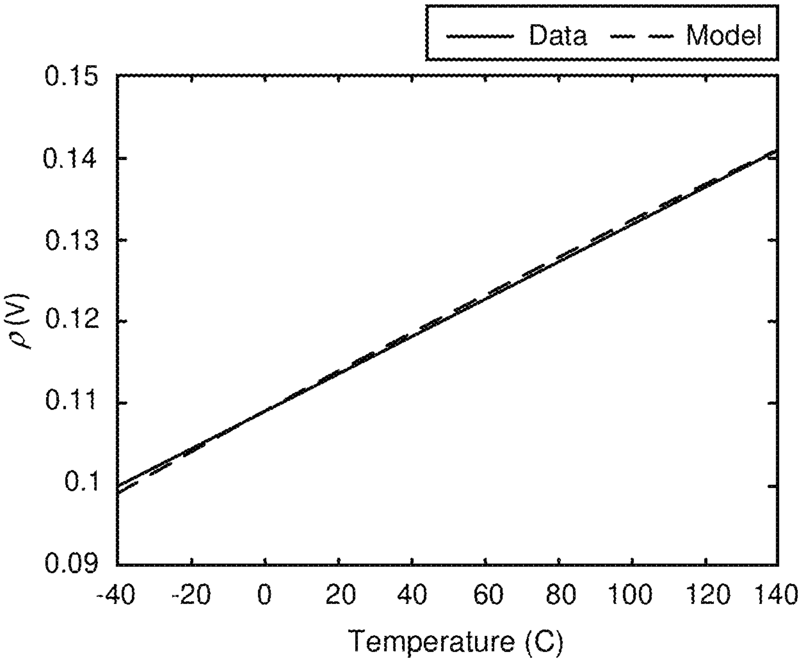

Eq. 11 is validated by the simulation data graphically shown in FIGS. 6A-6C, where the linear temperature is dependent on $\sqrt{I_5/\mu_n C_{ox}}$. Thus, the difference in the gate-to-source bias voltage between transistor M2 and M1 approximates to:

$$\Delta V_{GS2,1} \sim \Delta V_{th0}(1+\alpha_{\Delta V_{th}}\Delta T)+N\sqrt{I_0/\beta_{eff,0}}\left(1+\frac{(\alpha_\mu-\alpha_R)\Delta T}{2}\right) \quad \text{Eq. 12}$$

Where $\Delta V_{th0}$ is the difference in threshold voltage between M2 and M1 at room temperature and $\beta_{eff,0}$ is the $\beta_{eff}$ at room temperature. To obtain a zero TC, Eq. 12 is set to 0 as follows:

$$\frac{\delta V_{ref}}{\delta T} = \Delta V_{th0}\alpha_{\Delta V_{th}} + N\sqrt{I_0/\beta_{eff,0}}\left(\frac{(\alpha_\mu-\alpha_R)}{2}\right) = 0 \quad \text{Eq. 13}$$

Furthermore, $$I_0=(\Delta V_{th0}+N\sqrt{I_0/\beta_{eff,0}})/r_1^0 \quad \text{Eq. 14}$$

Accordingly, the zero TC condition parameters of circuit 300 can be obtained by solving Eqs. 13 and 14. For example, Eqs. 13 and 14 can be solved for N and $r_1^0$. A pair of N and $r_1^0$ that satisfy Eqs. 13 and 14 may lead to zero TC conditions, where an optimum N facilitates selecting sizes of transistors M1 and M2 and $r_1^0$ sets the resistance value of resistor R1.

FIGS. 6A through 6C are example plots of parameters for obtaining zero TC conditions according to embodiments of the disclosed technology. In each of FIG. 6A-6C, simulation data was acquired, which is plotted as a solid line in each figure, and a model was generated that fit the simulated data, which is plotted as a dotted line. The models may be used to provide parameters for obtaining zero TC condition in place of solving Eq. 13 and 14 above. That is, the models that fit the simulation data of FIG. 6A-6C may be used to derive parameters of circuit 300 for obtaining zero TC conditions. The models 1) confirm the preceding equations describe the temperature behaviors of $\Delta V_{th}$, $\beta_{eff}$, and ρ and 2) provides values of $\alpha_{\Delta V_{th}}$, $\Delta V_{th0}$, $\alpha_{\mu_n}$, $\beta_{eff,0}$, $\alpha_\rho$, and $\rho_0$, which can be used when solving the Eqs. 13 and 14 and find the zero TC condition.

FIG. 6A illustrates a graph of $\Delta V_{th2,1}$ as a function of temperature provided in degrees Celsius. The model in FIG. 6A that fits the simulated data is provided as:

$$\Delta V_{th2,1}=\Delta V_{th0}(1+\alpha_{\Delta V_{th}}\Delta T) \quad \text{Eq. 15}$$

Where $\alpha_{\Delta V_{th}}$ is $520.6\times10^{-6}$1/° C. and $\Delta V_{th0}$ is 206 millivolts.

FIG. 6B illustrates a graph of $\beta_{eff}$ plotted as a function of temperature provided in degrees Celsius. The model in FIG. 6B that fits the simulated data is provided as:

$$\beta_{eff}=\beta_{eff,0}(1+\alpha_{\mu}\Delta T) \quad \text{Eq. 16}$$

Where Eq. 5 can be modeled as Eq. 15, $\alpha_\mu$ is $4606\times10^{-6}$1/° C. and $\beta_{eff,0}$ is 707 μA/V$^2$.

FIG. 6C illustrates a variable p plotted as a function of temperature provided in degrees Celsius. The model in FIG. 6C that fits the simulated data is provided as:

$$\rho=\sqrt{1/\beta_{eff}}=\rho_0(1+\alpha_\rho\Delta T) \quad \text{Eq. 16}$$

Where $\alpha_\rho$ is $2106\times10^{-6}$1/° C. and $\rho_0$ is the variable ρ at room temperature and is 109 millivolts.

Figure 7B:
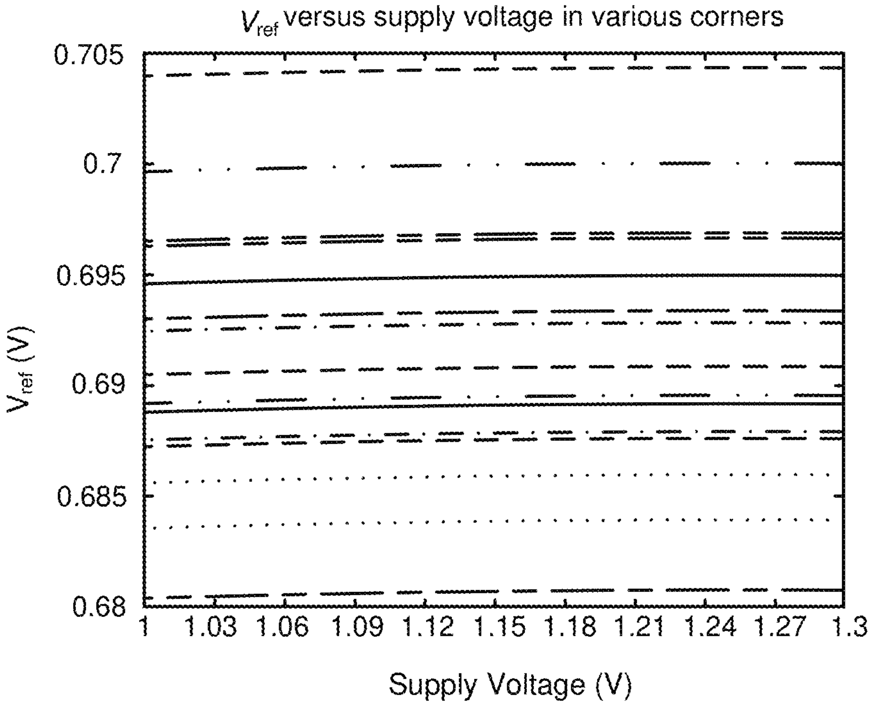

FIGS. 7A and 7B are examples plots illustrating stability, with respect to PVT variations, of output voltage $V_{ref}$ according to embodiments of the disclosed technology. Each plotted line of FIGS. 7A and 7B corresponds to an individual process corner (e.g., 15 corners in these examples), with FIG. 7A illustrating the voltage $V_{ref}$ generated by the reference voltage generator 200 plotted as a function of temperature and FIG. 7B illustrating the voltage $V_{ref}$ generated by the reference voltage generator 200 plotted as a function of supply voltage.

As shown in FIG. 7A, for each process corner, the output voltage $V_{ref}$ with respect to temperature is substantially constant. For example, with reference to FIG. 7A, the mean output voltage across all corners is 0.69 V, with a standard deviation of 6 millivolts and a temperature coefficient of less than 43 ppm/° C. Temperature coefficient (TC) can be determined by, for a given corner, determining the difference between the maximum value of $V_{ref}$ and the minimum value of $V_{ref}$, dividing this difference by the average value of $V_{ref}$, and then multiply the result by one over the temperature range (e.g., ΔT or 180° C. in this example). The result can then be multiplied by 100 to provide TC in terms of percentages, which can be divided by 1 million to provide TC in terms of parts per million (e.g., ppm). Thus, $TC=((\max(V_{ref})-\min(V_{ref}))/\text{avg}(V_{ref}))\times(100/\Delta T)$. Thus, subject to process variations, the TC of the embodiments disclosed herein changes minimally (e.g., 43 ppm/° C.), as shown below in Table 1. In various embodiments, the TC is minimal because the output voltage $V_{ref}$ is dependent of the ratio of resistance of the resistor R2 to R1 and on the difference between threshold voltage of transistors M1 and M2. Thus, while process variations may change for each corner and the resistance values and threshold voltages may change, these parameters change the same way. For example, for the fast-fast corner, if one parameter shifts up by 5% (e.g., threshold voltage of transistor M1), parameters of the other components (e.g., transistor M2 and resistors R1 and R2) also shift in the same way.

Similarly, FIG. 7B shows that the output voltage $V_{ref}$ with respect to the supply voltage is substantially constant. For example, with reference to FIG. 7B, the mean output voltage across all corners is 0.69 V, with a standard deviation of 6 millivolts and a regulation of less than 0.25%/V (e.g., how the output voltage changes with respect to supply voltage). Thus, subject to process variations, the embodiments disclosed herein exhibit good regulation within a given process variation. In various embodiments, the regulation is minimal because, as described above, the output voltage $V_{ref}$ is dependent of the ratio of resistance of the resistor R2 to R1 and on the difference between threshold voltage of transistors M1 and M2. Thus, while process variations may change for each corner and the resistance values and threshold voltages may change, these parameters change the same way, thereby providing for the relatively consistent $V_{ref}$ over a range of supply voltages.

Figure 8A:
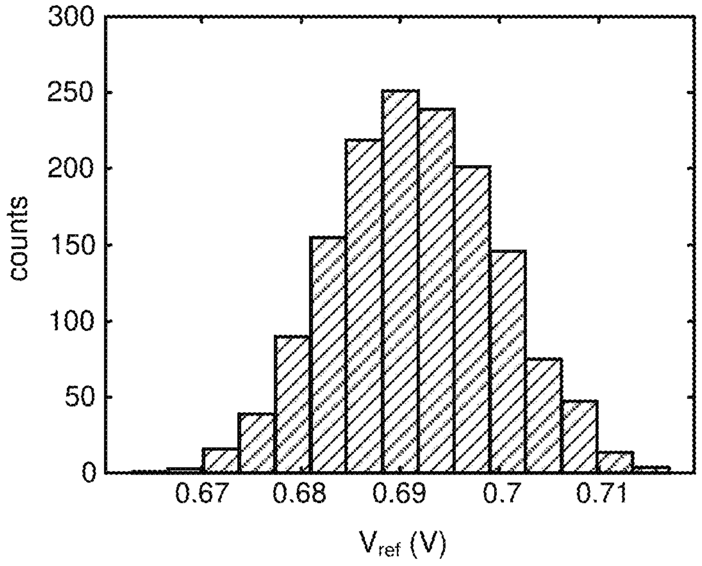
FIGS. 8A-8C are histograms of Monte Carlo simulations of embodiments of the disclosed technology across all corners.
Figure 8B:
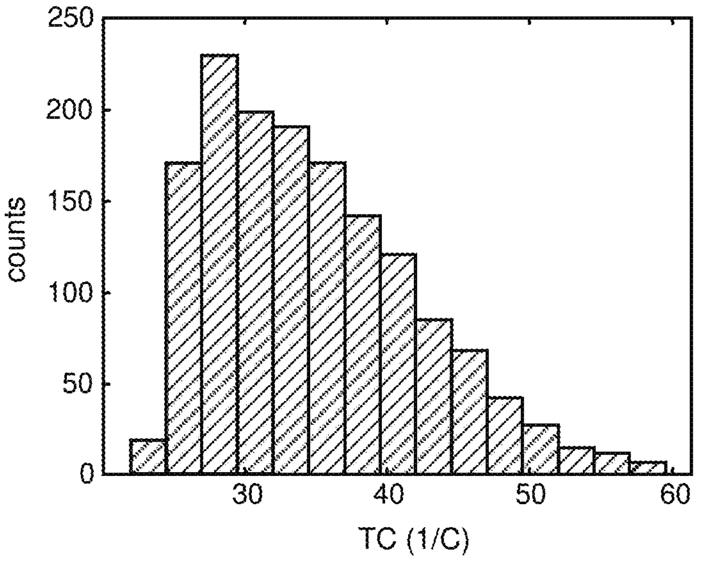
Figure 8C:
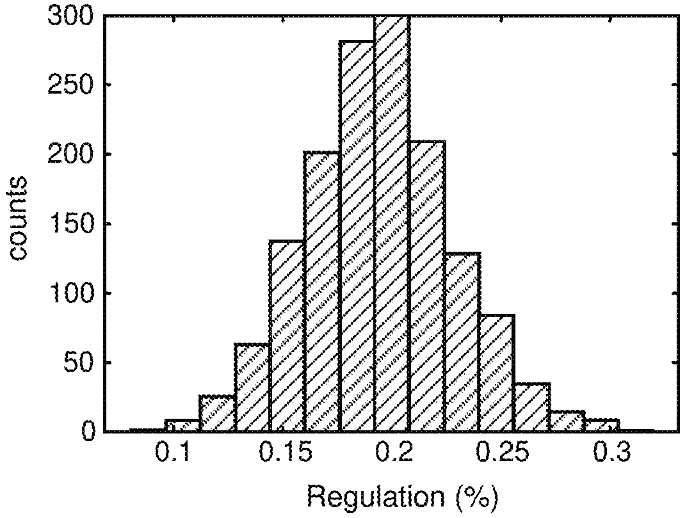

FIGS. 8A-8C are histograms of Monte Carlo simulations of embodiments of the disclosed technology across all corners. To generate FIGS. 8A-8C, 100 Monte Carlo simulations were performed across all 15 process corners, thereby providing 15,000 simulation points. FIG. 8A illustrates counts of the Monte Carlo simulations as a function of output voltage $V_{ref}$, where the mean voltage is 0.69V with a standard deviation of 8 millivolts. FIG. 8A illustrates counts of the Monte Carlo simulations as a function of temperature coefficient (TC), where the mean TC is 34 ppm/° C. with a standard deviation of 7.2 ppm/° C. and a maximum TC of 59 ppm/° C. FIG. 8C illustrates counts of the Monte Carlo simulations as a function of regulation, where the mean regulation is 59 0.19%/V with a standard deviation of 0.03%/V and a maximum regulation of 0.31%/V.

Figure 9A:
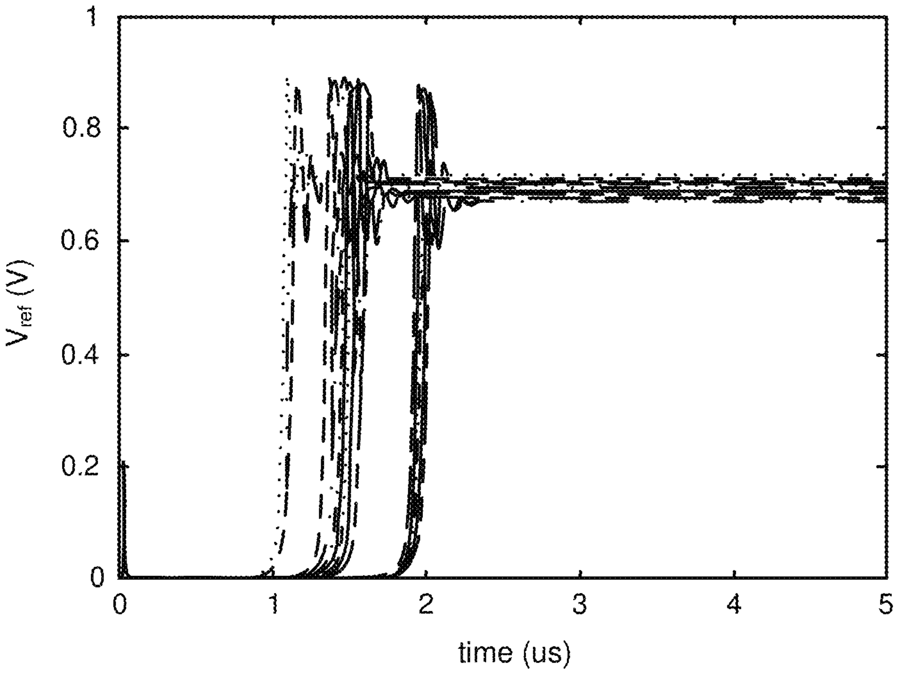
FIGS. 9A-9C are plots illustrating example advantages of a startup device included in a reference voltage generator according to embodiments of the disclosed technology.
Figure 9B:
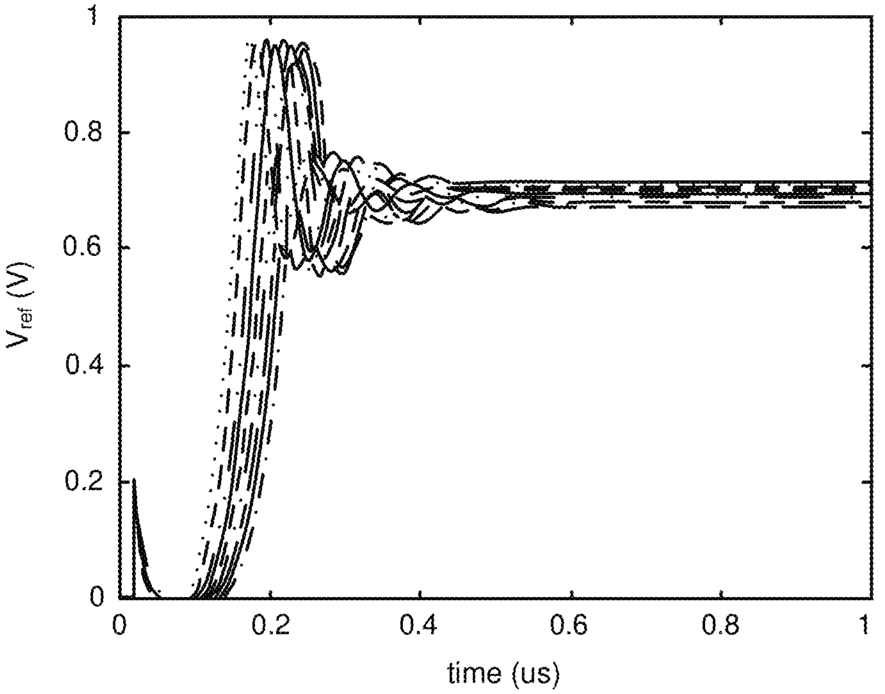
Figure 9C:
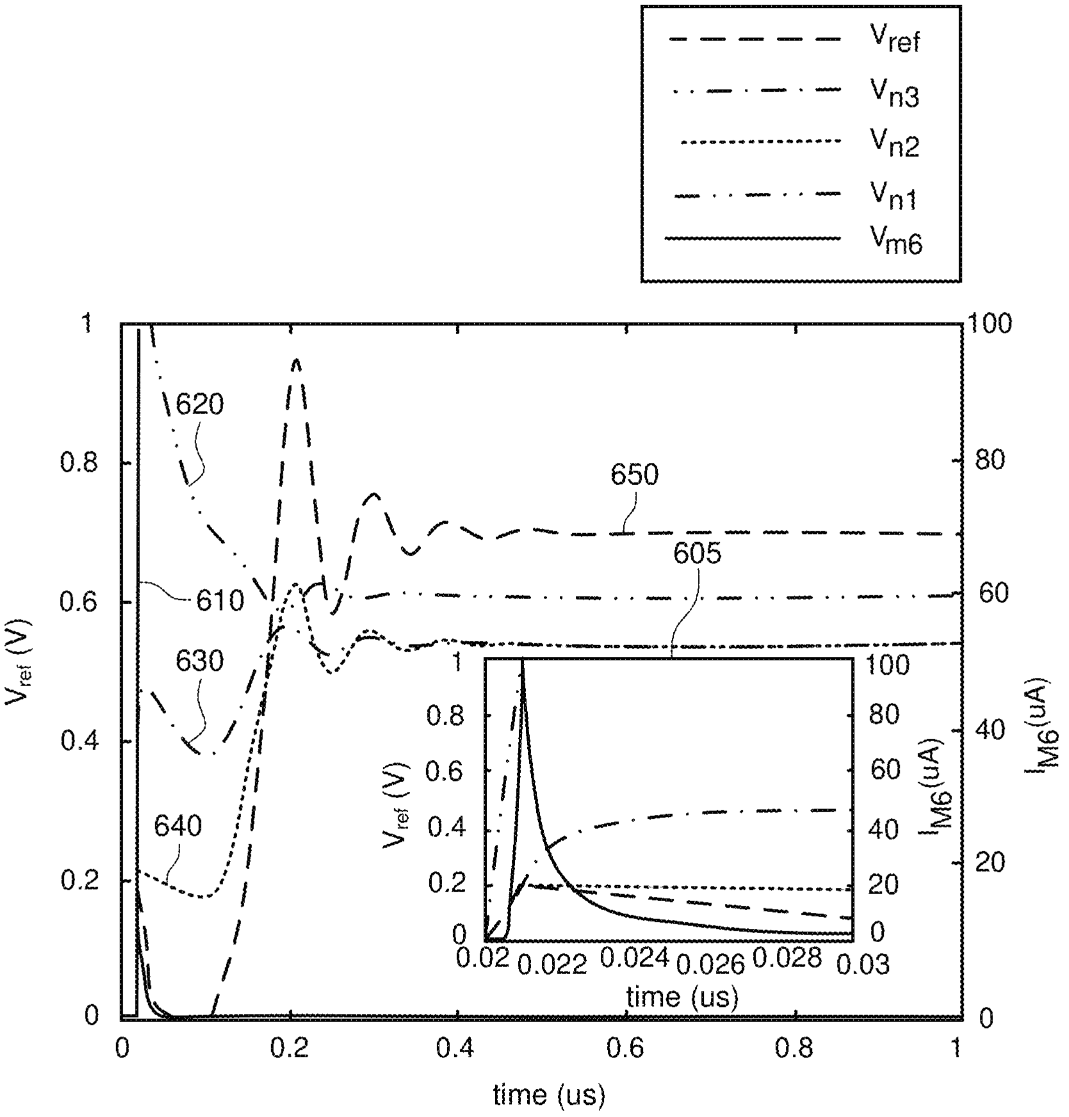

FIGS. 9A-9C are plots illustrating some example advantages of the startup devices (e.g., startup device(s) 210 and/or 310) according to embodiments of the disclosed technology. For example, along with removing the degenerate point, as described above, the startup device(s) 210 may also reduce the length of the settling period, in terms of time, for the reference voltage to stabilize on startup. That is, the length of time needed to execute the entire method 400 (e.g., for the circuit 300 to settle), may be 4 times less than conventional voltage reference generation circuits.

For example, FIG. 9A illustrates 100 Monte Carlo simulations across 15 corners of the circuit 300, except that transistor M6 is removed (e.g., startup device(s) 210 are not present). As shown in FIG. 9A, the worst-case settling time of output voltage $V_{ref}$ without startup device(s) 210 is approximately 2.2 is, while the best case is approximately 1 μs. Whereas, FIG. 9B illustrates 100 Monte Carlo simulations across 15 corners of the circuit 300 including the transistor M6. As shown in FIG. 9B, the worst-case settling period of output voltage $V_{ref}$ is approximately 0.6 μs, and the best case is well under 0.2 μs.

FIG. 9C depicts various current levels and voltage levels present in the reference voltage generator 200 plotted as a function of time following activating the supply voltage VDDQ. FIG. 9C illustrates voltages as a function of time at nodes N1, N2, N3, and N4 (e.g., $V_{n1}$, $V_{n2}$, $V_{n3}$, and $V_{ref}$, respectively), where voltages is on the left side of the plot. FIG. 9C also illustrates current $I_{m6}$ at the drain terminal of transistor M6.

Thus, as shown in FIG. 9C, startup device(s) 210 provide to reduce the startup process times and settling periods. For example, as described above in connection with FIGS. 3A and 4, at the beginning of startup when the supply voltage is turned on, inputs terminals of operational amplifier 312 are at low voltage and output terminal (e.g., node N1) is close to VDDQ. Transistor M6 charges up the negative terminal of the operational amplifier 312 (e.g., node N3), which in turn reduces the output voltage of the operational amplifier 312 until the circuit 300 stabilizes at non-zero (e.g., non-degenerate point).

Table 1 below compares the embodiments of the disclosed technology in column 8 against comparative examples 1-7 of conventional voltage refence generating circuits. Table 1 provides a type of voltage refence generating circuit, which indicates whether the circuit implements BJTs or CMOS. As shown in Table 1, embodiments disclosed herein provide for a larger range of temperature (e.g., −40 to 140° C.) across which output voltage is relatively stable, e.g., TC is a maximum (μ) of 59 ppm/° C. with a standard deviation (δ) of 7 ppm/° C. These TC results are achieved by the embodiment disclosed herein while also providing an adjustable reference voltage, which none of the conventional circuits provide.

Furthermore, the TC results are achieved without trimming, for example, by calibrating the circuit for process variations. For example, while conventional circuit of example 7 achieves a maximum TC of 4 ppm/° C., example 7 requires trimming of the circuit in order to achieve this result. Additionally, the temperature range over which the TC was achieved by example 7 is smaller than that provided by the embodiments disclosed herein (e.g., −40° C. to 125° C.). While the embodiments herein do not require trimming or calibration to achieve the results shown in Table 1 (or FIGS. 7A-8C), the embodiments disclosed herein may be calibrated or trimmed which will further improve the insensitivity of the output voltage to PVT variations, as will be described below.

purposes only. Nonetheless, the description of circuit 300 above applies equally to circuit 1000, except where explicitly stated otherwise herein.

As alluded to in connection with FIG. 2, the reference voltage generator 200 may be adjustable and circuit 1000 is an example circuit implementation for providing adjustability of the output voltage $V_{ref}$. The tunable output voltage $V_{ref}$ may be achieved via the tunable resistor R3. As described above in connection with Eq. 1, the output voltage $V_{ref}$ is based on the ratio of R1 to R3. Accordingly, the output voltage $V_{ref}$ may be by changing the resistance of resistor R3.

Figure 10:
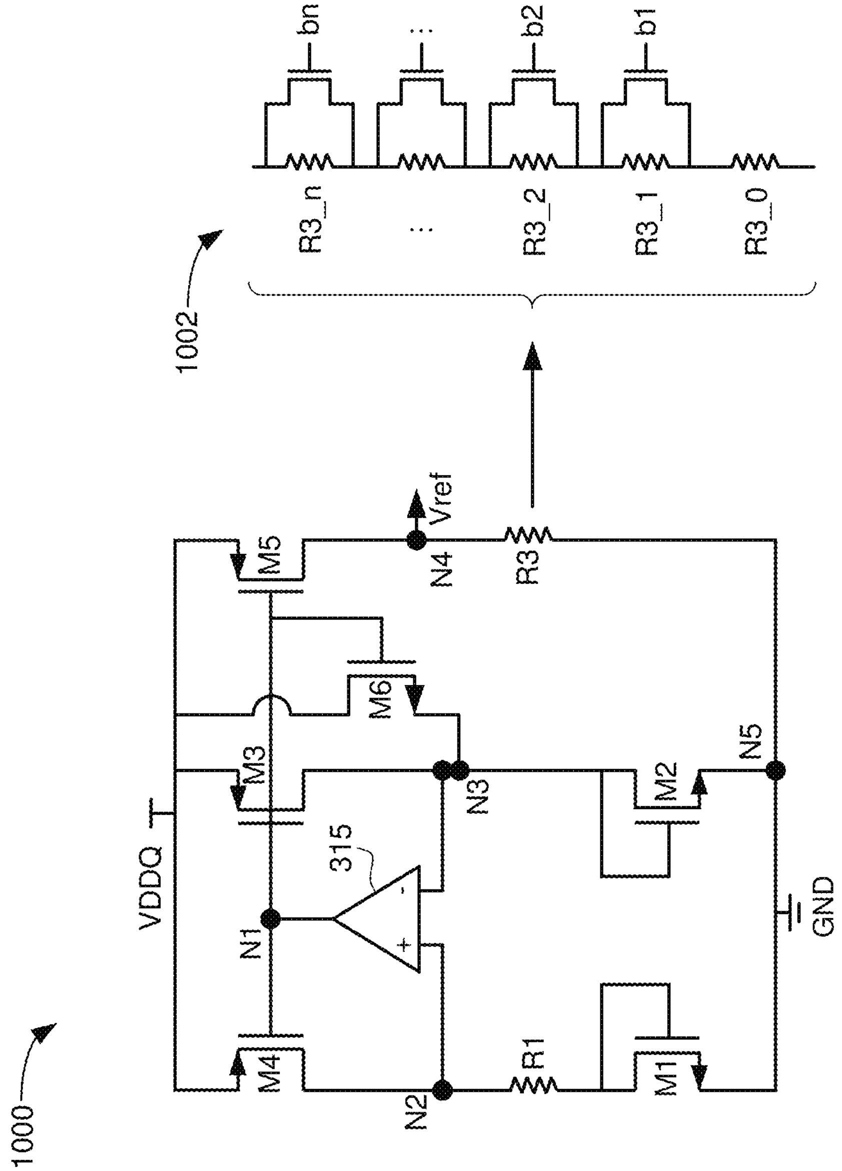
FIG. 10 depicts another example circuit implementation of the reference voltage generator according to an embodiment of the disclosed technology.

FIG. 10 illustrates an example implementation of a tunable resistor R3, which is shown as a digitally adjustable resistor 1002. The resistor 1002 comprises a plurality of resistors R3_0 through R3_n, each connected to a switch b1 through bn. Each switch b1-bn may be controlled by, for example, a computing device, such as the computing device 1510 of FIG. 1500. One or more switches may be activated based on a desired resistance value, and the associated resistors R3_0 through R3_n may be connected to circuit 1000 to provide the desired resistance value. For example, if a resistance value $r3_1$ corresponding to R3_1 is desired, then switch b1 is turned on while all other switches are turned off. This connects resistor R3_1 thereby applying the resistance value of $r3_1$. While FIG. 10 is provided with reference to digitally adjustable resistor 1002, one skilled in the art will appreciate that any tunable resistor may be implemented in place of digitally adjustable resistor 1002, as long as the resistor R3 is capable of being tuned to a desired resistance value.

Figure 11A:
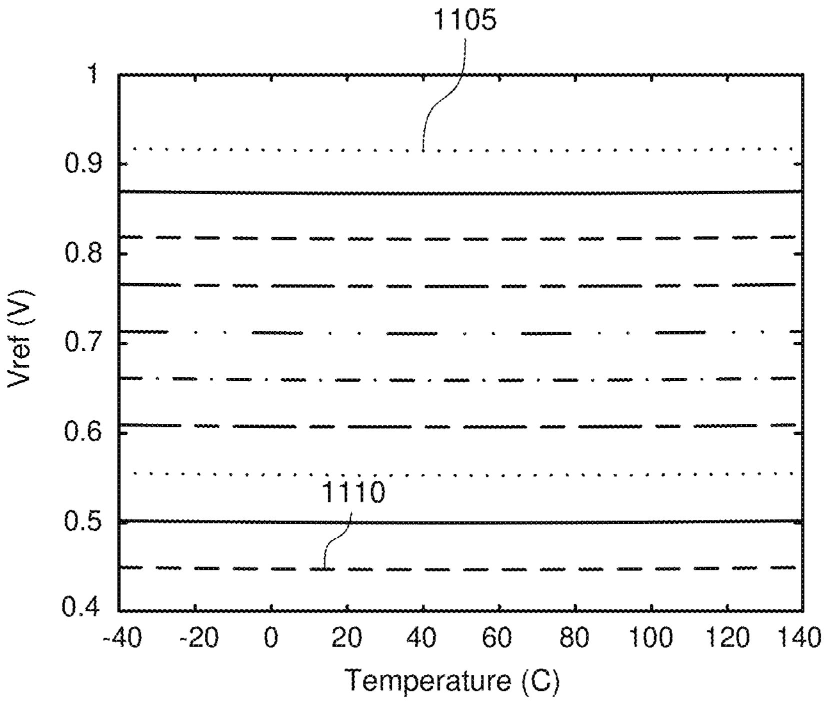
FIGS. 11A and 11B depict examples plots illustrative of stability, with respect to PVT variations, of an output reference voltage generated by the circuit implementation of FIG. 10.
Figure 11B:
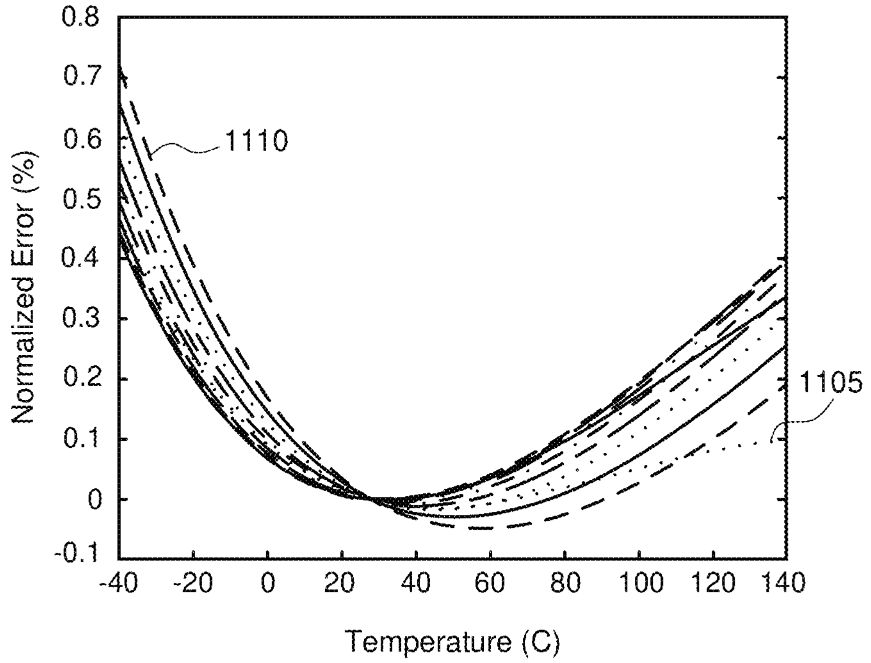

FIGS. 11A and 11B depict examples plots illustrative of stability of output voltage $V_{ref}$ with respect to PVT variations based on circuit 1000 of FIG. 10. Each plotted line of FIGS. 11A and 11B corresponds to a different resistance value to which tunable resistor R3 is set. For example, line 1105 corresponds to a resistance value of 108 kΩ and line 1110 corresponds to a resistance value of 52 kΩ. For each resistance value, FIG. 11A illustrates the output voltage $V_{ref}$ as a function of temperature, while FIG. 11B illustrates a normalized error of the output voltage $V_{ref}$ as a function of temperature. As shown in FIG. 11A, for a given resistance value, $V_{ref}$ is fairly stable and does not noticeably fluctuate

TABLE 1

| Type | | Comp. Ex. [1] CMOS | Comp. Ex. [2] BJT | Comp. Ex. [3] BJT | Comp. Ex. [4] BJT | Comp. Ex. [5] CMOS | Comp. Ex. [6] CMOS | Comp. Ex. [7] BJT | Disclosed Embodiment CMOS |
|---|---|---|---|---|---|---|---|---|---|
| Supply Range (V) | — | 1.4-3.6 | 1.5-2.5 | 0.5-1.5 | 1.6-2 | 0.24-0.4 | 1.2-1.8 | 2-5 | 1-1.3 |
| Line Regulation | μ | 0.31 | 0.062 | 1.11 | 0.02 | 4.09 | 0.28 | — | 0.19 |
| (%/V) | δ | — | — | — | — | — | — | — | 0.03 |
| Reference | μ | 1.25 | 1.19 | 0.5 | 1.09 | 0.2 | 0.5 | 1.14 | 0.69 (adjustable) |
| voltage (V) | δ | 0.010 | 0.4/3% | 2/3% | 1.5/3% | — | 0.006 | 0.97% | 0.008 |
| Temperature range (° C.) | — | 0:100 | −20:100 | 0:80 | −40:125 | 10:90 | 0:100 | −40:125 | −40:140 |
| TC (ppm/° C.) | μ | 31 | 25 | 100 | 8 | 134 | 220 | 4 | 59 |
| | δ | 14 | — | 8 | — | 42 | 60 | 2.3 | 7 |
| Trimming | — | NO | NO | YES | YES | NO | — | Yes | NO |

FIG. 10 depicts another example circuit implementation 1000 of the reference voltage generator 200 according to an embodiment of the disclosed technology. Circuit 1000 is substantially the same as circuit 300 of FIGS. 3A and 3B, except that resistor R2 is replaced with a tunable resistor R3. The groupings 310, 320, and 33 of the electrical elements depicted in FIG. 3A are not shown in FIG. 10 for illustrative at the scale shown in FIG. 11A. Similarly, as shown in FIG. 11B, the normalized error as a function of temperature does not exceed 0.8% at the worst-case. Thus, as shown in FIGS. 11A and 11B, embodiments disclosed herein are capable of providing adjustable output voltage while maintaining temperature insensitivity.

Additionally, embodiments disclosed herein are capable of accounting for any lingering process induced variations.

For example, with reference to FIG. 7A, while the output voltage $V_{ref}$ for a given process corner as a function of temperature is relatively stable, there may be output voltage variations across the corners. For example, as shown in FIG. 7A, the output voltage $V_{ref}$ across corners is between 0.71 V to 0.68 V. That is, while FIGS. 7A and 7B illustrate good stability with respect to temperature and supply voltage, there may be lingering instability in the output voltage due to process induced variations. Accordingly, circuit 1000 can account for such fluctuations through tuning of resistor R3 on a fully assembled circuit. That is, once the various transistors are fabricated and connected to form circuit 1000, a calibration operation may be performed by tunning the resistance value of R3 to provide a desired output voltage $V_{ref}$. The resulting output voltage $V_{ref}$ would be stable with respect to temperature and supply voltage, as described herein, and would no longer be subject to any lingering process induced instability.

Figure 12:
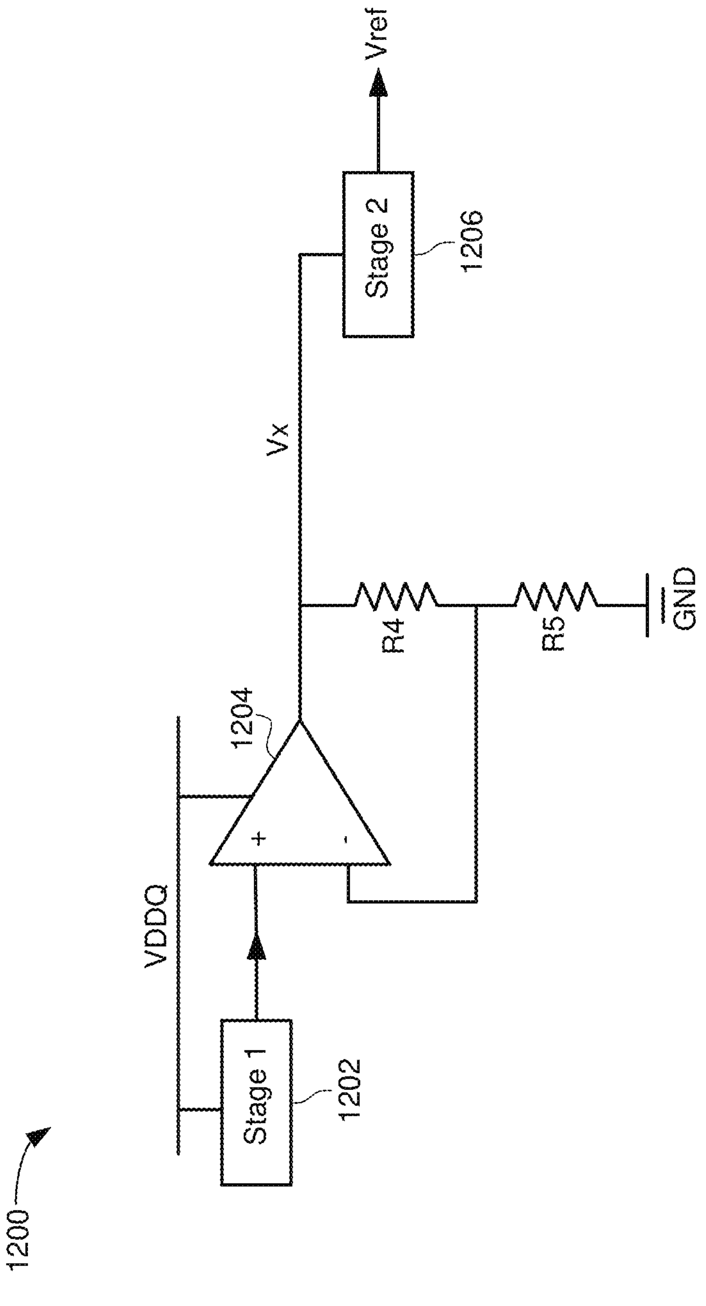
FIG. 12 depicts an example circuit implementation of a two-stage reference voltage generator according to an embodiment of the disclosed technology.

FIG. 12 depicts an example circuit implementation 1200 of a two-stage reference voltage generator according to an embodiment of the disclosed technology. Circuit 1200 comprises a first stage reference generator 1202 (also referred to herein as a first stage circuit) coupled to a supply voltage VDDQ at an input and positive terminal of an operational amplifier 1204 at an output of the first stage reference generator 1202. The output terminal of the operational amplifier 1204 is coupled to a second stage reference generator 1206 (also referred to herein as a second stage circuit) via an input and a first terminal of a resistor R4. A second terminal of resistor R4 is coupled to a first terminal of resistor R5, having a second terminal connected to ground GND. The second terminal of resistor R4 and the first terminal of resistor R5 are coupled to the negative terminal of the operational amplifier 1204. The second stage reference generator 1206 output s reference volage $V_{ref}$.

The first stage reference generator 1202 may be implemented, for example, as the reference voltage generator 200. For example, circuit 300 or circuit 1000 may be example circuit implementations of the first stage reference generator 1202. Thus, for example, the supply voltage VDDQ may be coupled to source terminals M3-M5 of circuit 300 or circuit 1000, and the output voltage from node N4 from circuit 300 or circuit 1000 may be supplied to positive terminal of operational amplifier 1204.

Similarly, the second stage reference generator 1206 may be implemented, for example, as the reference voltage generator 200. That is the second stage reference generator 1206 may be identical to the first stage reference generator 1202. For example, circuit 300 or circuit 1000 may be example circuit implementations of the second stage reference generator 1206. Thus, for example, the output Vx from the operational amplifier 1204 may be coupled to source terminals M3-M5 of circuit 300 or circuit 1000 (e.g., in place of supply voltage VDDQ), and the output voltage from node N4 from circuit 300 or circuit 1000 may be the output voltage $V_{ref}$.

Accordingly, the first stage reference generator 1202 generates a relatively stable output voltage, as described above, which is supplied to the operational amplifier 1204. The operational amplifier 1204 functions to include the voltage output from the first stage reference generator 1202, and supply the amplified voltage Vx to the second stage reference generator 1206, for example, as the input thereto. The stage reference generator 1206 then generates an output voltage Vref, which increases the stability of the output voltage (e.g., increases the insensitivity to PVT variations). For example, the total sensitivity of circuit 1200 is the sensitivity of the first stage reference generator 1202 (e.g., $\delta Vx/\delta VDDQ$) multiplied by the sensitivity of the second stage reference generator 1206 (e.g., $\delta V_{ref}/\delta Vx$), which results in very low line sensitivity to PVT variations (as shown below in Table 2 and described in connection with FIGS. 13A-14F).

Along with increased reference voltage stability, circuit 1200 provides for additional technical advantages, such as low supply voltage requirements and ease of design. For example, circuit 1200 does not require adding Cascode devices (e.g., placing transistors on top of each other), which cannot operate at low supply voltages. Thus, low supply voltage operation (e.g., minimum supply voltage is $V_{GS2}+V_{OV3}$) is achieved, in part, by not using Cascode devices. Furthermore, circuit 1200 can be simple to design once one of stages 1202 or 1206 are designed. That is, once one stage is designed, the design can be repeated for the second stage giving two identical stages.

Figure 13A:
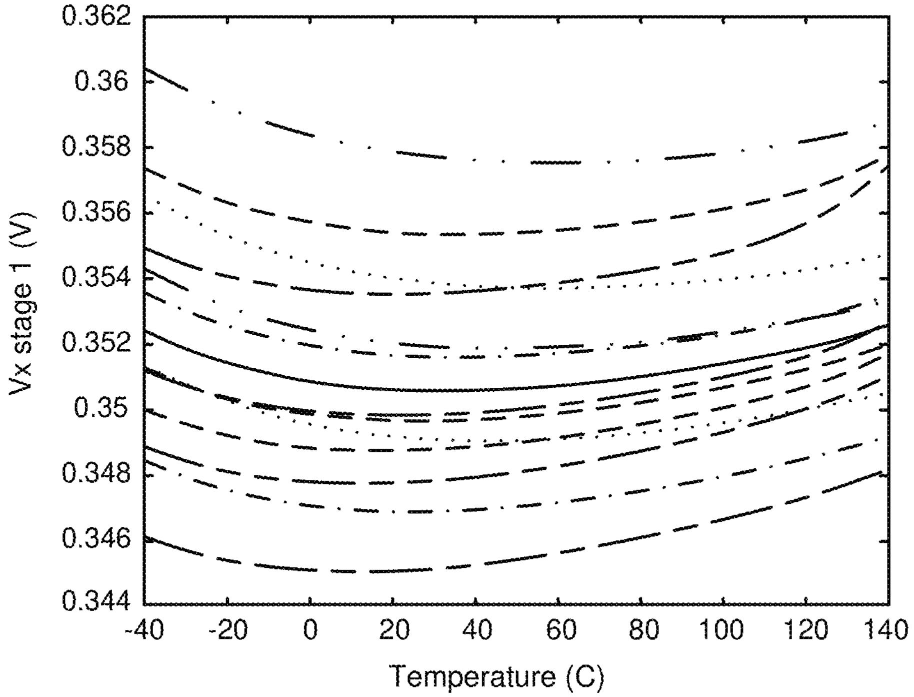
FIGS. 13A-13D are plots illustrating stability, with respect to PVT variations, in an output reference voltage provided by the two-stage reference voltage generator of FIG. 12.
Figure 13B:
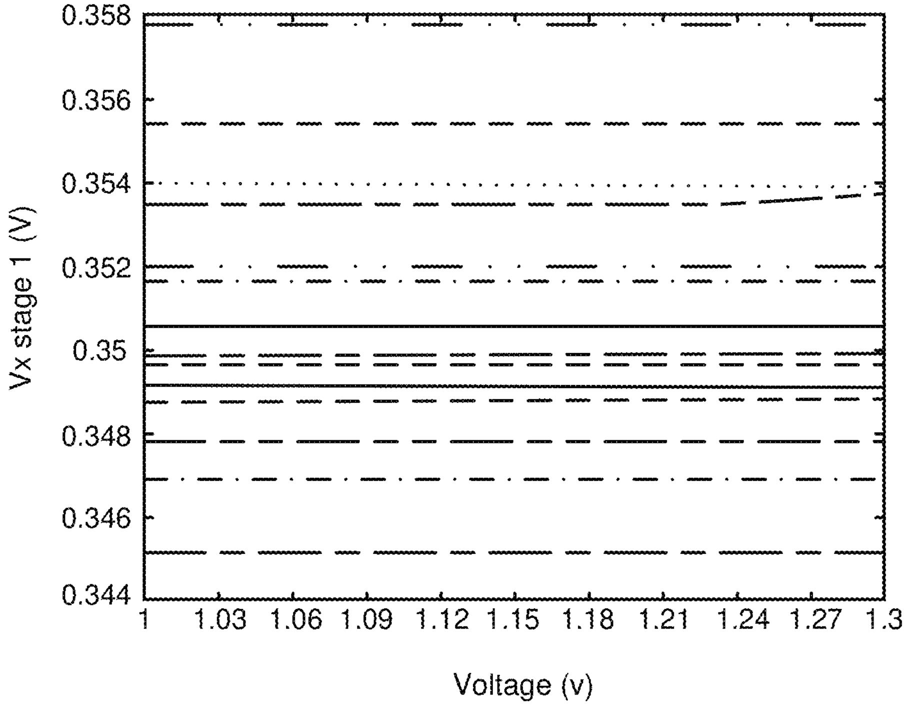
Figure 13C:
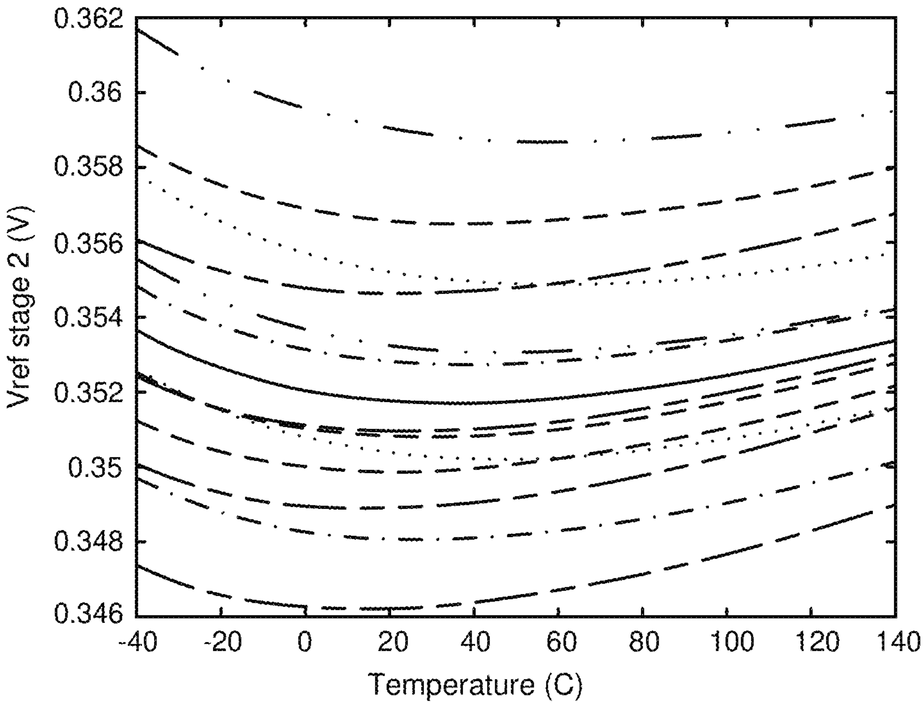
Figure 13D:
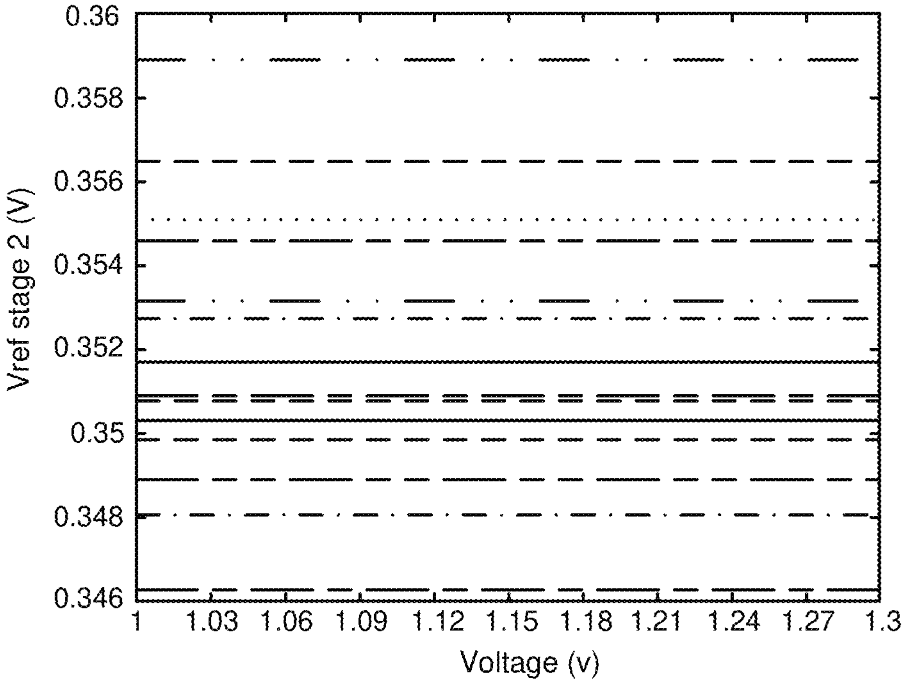

FIGS. 13A-13D are plots illustrating an increased stability in output voltage $V_{ref}$ provided by the two-stage reference voltage generator of FIG. 12. FIGS. 13A and 13B depict examples plots illustrative of the stability of output voltage Vx from the first stage reference generator 1202 and FIGS. 13C and 13D depict examples plots illustrative of stability of output voltage $V_{ref}$ from the second stage reference generator 1206. Each plotted line of FIGS. 13A-13D corresponds to an individual process corner (e.g., 15 corners in these examples). FIGS. 13A and 13C illustrate the voltages Vx and $V_{ref}$, respectively, plotted as a function of temperature, while and FIGS. 13B and 13D illustrate the voltages Vx and $V_{ref}$, respectively, plotted as a function of supply voltage.

As shown in FIG. 13A, for each process corner, the output voltage Vx with respect to temperature is relatively stable. For example, with reference to FIG. 13A, the mean output voltage across all corners is 0.35 V, with a standard deviation of 3 millivolts and a temperature coefficient of less than 42 ppm/° C. Whereas, FIG. 13C illustrates the output voltage $V_{ref}$ has increased stability with respect to temperature. For example, while the mean output and standard deviation remain the same, the TC is reduced to less than 37 ppm/° C.

Similarly, FIG. 13B, for each process corner, the output voltage $V_{ref}$ with respect to supply voltage is relatively stable. For example, with reference to FIG. 13B, the mean output voltage across all corners is 0.35 V, with a standard deviation of 3 millivolts and a regulation of 0.07%/V. Whereas, FIG. 13D illustrates the output voltage $V_{ref}$ has increased stability with respect to supply voltage. For example, while the mean output and standard deviation remain the same, the regulation is reduced to 0.00016%/V.

Accordingly, the two-stage reference voltage generator of FIG. 12 improves the TC by at least 1.13 times and improves the regulation by 437 times.

Figure 14A:
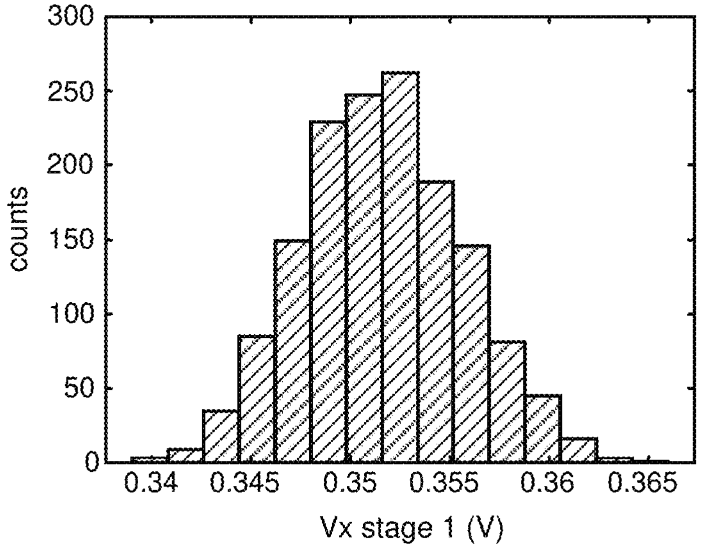
FIGS. 14A-14F are histograms of Monte Carlo simulations of the two-stage reference voltage generator of FIG. 12 across all corners.
Figure 14B:
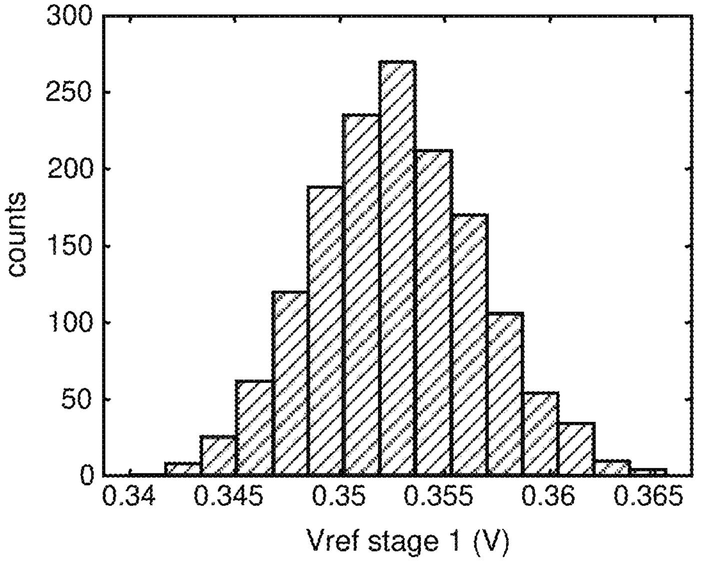
Figure 14C:
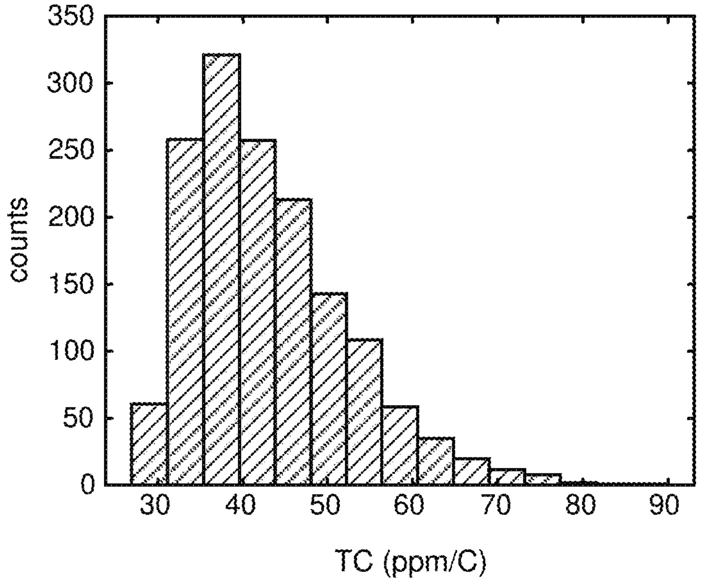
Figure 14D:
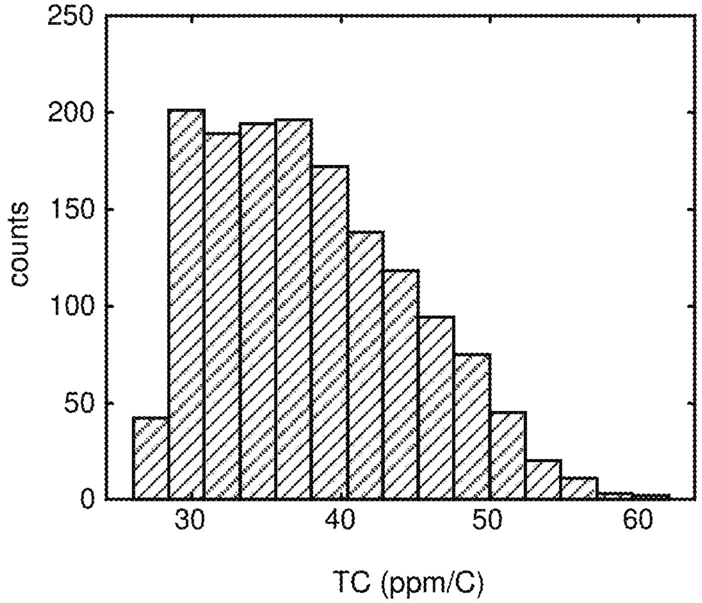
Figure 14E:
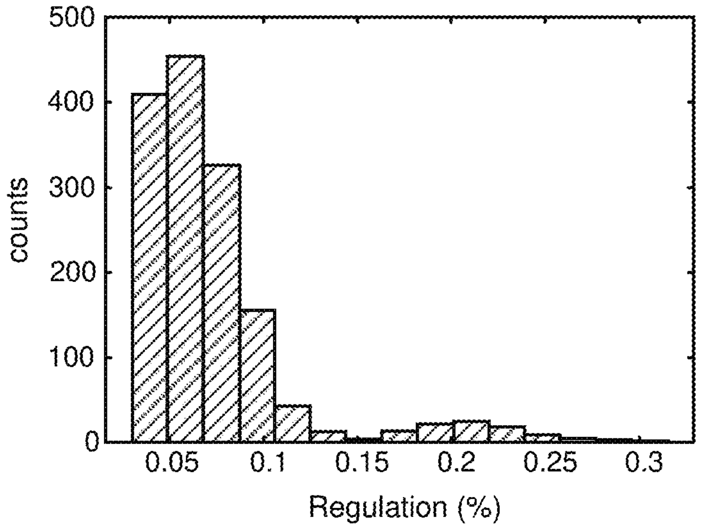
Figure 14F:
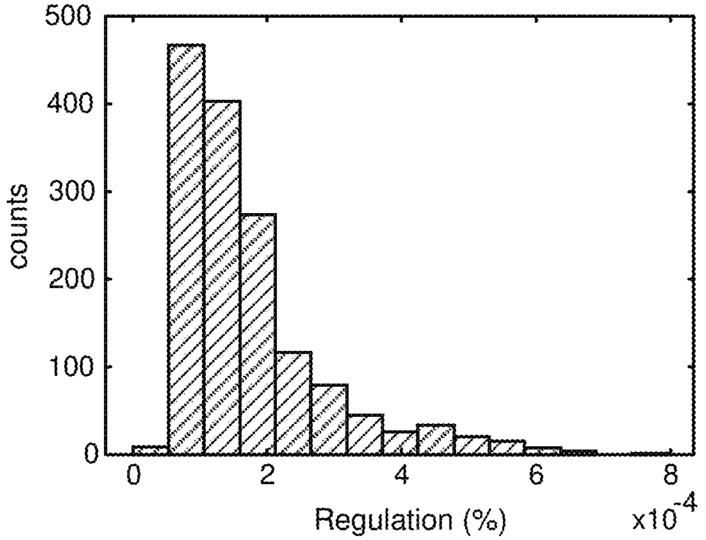

FIGS. 14A-14E are histograms of Monte Carlo simulations of an embodiment of the disclosed technology across all corners. Particularly, 100 Monte Carlo simulations of circuit 1200 were performed across all 15 process corners, thereby providing 15,000 simulation points. FIGS. 14A and 14B illustrate counts of the Monte Carlo simulations as a function of output voltage Vx and $V_{ref}$, where FIGS. 14A and 14B illustrate results from the first and second stage reference generators 1202 and 1206, respectively. In both simulations the mean voltage is 0.35V with a standard deviation of 4 millivolts. FIGS. 14C and 14D illustrate counts of the Monte Carlo simulations as a function of temperature coefficient (TC), where FIGS. 14C and 14D illustrate results from the first and second stage reference generators 1202 and 1206, respectively. In the case of FIG. 14C, the mean TC is 43 ppm/° C. with a standard deviation of 9.3 ppm/° C. and a maximum TC of 88.7 ppm/° C. Whereas, in FIG. 14D the mean TC is 38 ppm/° C. with a standard deviation of 6.7 ppm/° C. and a maximum TC of 61 ppm/° C. FIGS. 14E and 14F illustrates counts of the Monte Carlo simulations as a function of regulation, where FIGS. 14E and 14F illustrate results from the first and second stage reference generators 1202 and 1206, respectively. In the case of FIG. 14E, the mean regulation is 0.07%/V with a standard deviation of 0.04%/V and a maximum regulation of 0.3%/V. Whereas, in FIG. 14F the mean regulation is 0.00017%/V with a standard deviation of 0.00013%/V and a maximum regulation of 0.00079%/V.

Table 2 below compares the two-stage reference voltage generator of FIG. 12 of in column 7 against comparative examples 8-12 of conventional voltage refence generating circuits. Table 2 provides a type of voltage refence generating circuit, which indicates whether the circuit implements BJTs, CMOS, or a combination thereof. As shown in Table 2, embodiments disclosed herein provide for a larger range of temperature stability (e.g., −40 to 140° C.) in which output voltage is relatively stable, e.g., TC is a maximum (μ) of 38 ppm/° C. with a standard deviation (δ) of 6.7 ppm/° C., without requiring trimming. While the embodiments herein do not require trimming or calibration to achieve the results shown in Table 2 (or FIGS. 14A-14E), the embodiments disclosed herein may be calibrated or trimmed, which will further improve the insensitivity of the output voltage to PVT variations. These TC results are achieved by the embodiment disclosed herein while also providing an adjustable reference voltage, which none of the conventional circuits provide.

TABLE 2

| Type | | Comp. Ex. [8] Bipolar + CMOS | Comp. Ex. [9] CMOS | Comp. Ex. [10] CMOS | Comp. Ex. [11] CMOS + BJT | Comp. Ex. [12] CMOS + BJT | Disclosed Embodiment CMOS |
|---|---|---|---|---|---|---|---|
| Supply Range (V) | — | 0.7-1.8 | 0.75-1.2 | 1.2-1.8 | 2-5 | 1.35-1.8 | 1-1.3 |
| Line Regulation | μ | 6.47 | 0.242 | 0.28 | — | 0.298 | 0.00017 |
| (%/V) | δ | — | — | — | — | — | 0.00013 |
| Reference | μ | 0.551 | 0.474 | 0.5 | 1.14 | 0.63 | 0.35 (adjustable) |
| voltage (V) | δ | 8.86 m | 16 m | 6 m | 11 m | — | 4 m |
| Temperature range (° C.) | — | −40:120 | −40:90 | 0:100 | −40:125 | −20:80 | −40:140 |
| TC (ppm/° C.) | μ | 114 | 46 | 220 | 4 | 14.1 | 38 |
| | δ | — | 7.5 | 60 | 2.3 | — | 6.7 |
| Trimming | — | NO | NO | NO | YES | YES | NO |

Figure 15:
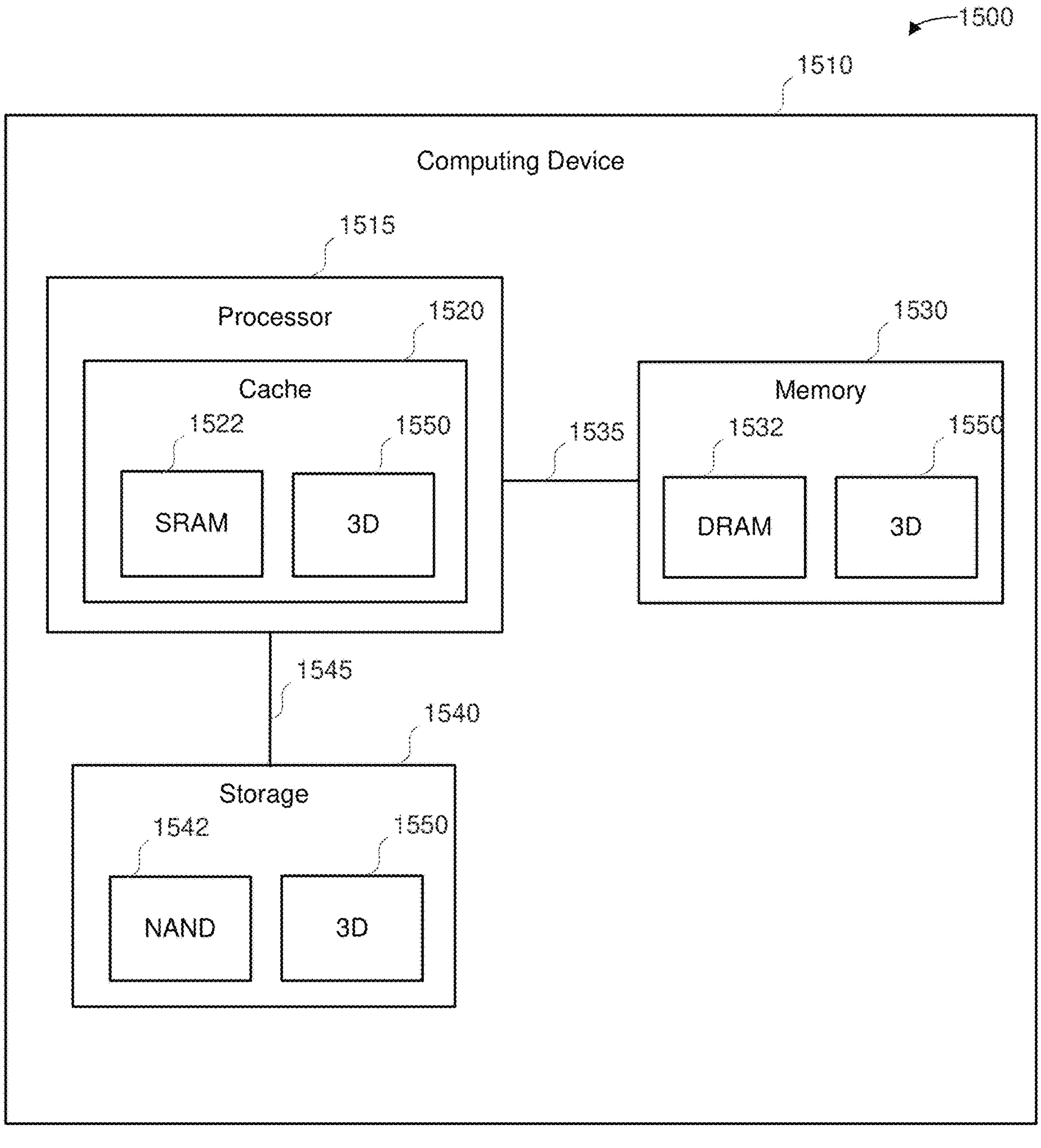
FIG. 15 is a schematic block diagram of a system in which a voltage level shifter according to example embodiments of the disclosed technology may be implemented.

FIG. 15 depicts a system 1500 comprising three-dimensional memory 1550. The system 1500 may include one or more reference voltage generators according to embodiments of the disclosed technology, such as those depicted in FIGS. 3A, 3B, 10, and/or 12. The reference voltage generator(s) may be provided to provide a tin FIG. 5. In the depicted embodiment, the system includes a computing device 1510. In various embodiments, a computing device 1510 may refer to any electronic device capable of computing by performing arithmetic or logical operations on electronic data. For example, a computing device 1510 may be a server, a workstation, a desktop computer, a laptop computer, a tablet, a smartphone, a control system for another electronic device, a network attached storage device, a block device on a storage area network, a router, a network switch, or the like. In certain embodiments, a computing device 1510 may include a non-transitory, computer readable storage medium that stores computer readable instructions configured to cause the computing device 1510 to perform steps of one or more of the methods disclosed herein.

In the depicted embodiment, the computing device 1510 includes a processor 1515, a memory 1530, and storage 1540. In various embodiments, a processor 1515 may refer to any electronic element that carries out the arithmetic or logical operations performed by the computing device 1510. For example, in one embodiment, the processor 1515 may be a general-purpose processor that executes stored program code. In another embodiment, a processor 1515 may be a field-programmable gate array (FPGA), an application-specific integrated circuit (ASIC), or the like, that operates on data stored by the memory 1530 and/or the storage 1540. In a certain embodiment, a processor 1515 may be a controller for a storage device (e.g., on a storage area network), a networking device, or the like.

In the depicted embodiment, the processor 1515 includes a cache 1520. In various embodiments, a cache 1520 may store data for use by the processor 1515. In certain embodiments, a cache 1520 may be smaller and faster than the memory 1530, and may duplicate data in frequently-used locations of the memory 1530, or the like. In certain embodiments, a processor 1515 may include a plurality of caches 1520. In various embodiments, a cache 1520 may include one or more types of memory media for storing data, such as static random access memory (SRAM) 1522, three-dimensional memory 1550, or the like. For example, in one embodiment, a cache 1520 may include SRAM 1522. In another embodiment, a cache 1520 may include three-dimensional memory 1550. In a certain embodiment, a cache 1520 may include a combination of SRAM 1522, three-dimensional memory 1550, and/or other memory media types.

The memory 1530, in one embodiment, is coupled to the processor 1515 by a memory bus 1535. In certain embodiments, the memory 1530 may store data that is directly addressable by the processor 1515. In various embodiments, a memory 1530 may include one or more types of memory media for storing data, such as dynamic random access memory (DRAM) 1532, three-dimensional memory 1550, or the like. For example, in one embodiment, a memory 1530 may include DRAM 1532. In another embodiment, a memory 1530 may include three-dimensional memory 1550. In a certain embodiment, a memory 1530 may include a combination of DRAM 1532, three-dimensional memory 1550, and/or other memory media types.

The storage 1540, in one embodiment, is coupled to the processor 1515 by a storage bus 1545. In certain embodiments, the storage bus 1545 may be a peripheral bus of the computing device 1510, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In various embodiments, the storage 1540 may store data that is not directly addressable by the processor 1515, but that may be accessed via one or more storage controllers. In certain embodiments, the storage 1540 may be larger than the memory 1530. In various embodiments, a storage 1540 may include one or more types of storage media for storing data, such as a hard disk drive, NAND flash memory 1542, three-dimensional memory 1550, or the like. For example, in one embodiment, a storage 1540 may include NAND flash memory 1542. In another embodiment, a storage 1540 may include three-dimensional memory 1550. In a certain embodiment, a storage 1540 may include a combination of NAND flash memory 1542, three-dimensional memory 1550, and/or other storage media types.

In various embodiments, three-dimensional memory 1550 may be used to store data in a cache 1520, memory 1530, storage 1540, and/or another component that stores data. For example, in the depicted embodiment, the computing device 1510 includes three-dimensional memory 1550 in the cache 1520, memory 1530, and storage 1540. In another embodiment, a computing device 1510 may use three-dimensional memory 1550 for memory 1530, and may use other types of memory or storage media for cache 1520 or storage 1540. Conversely, in another embodiment, a computing device 1510 may use three-dimensional memory 1550 for storage 1540, and may use other types of memory media for cache 1520 and memory 1530. Additionally, some types of computing device 1510 may include memory 1530 without storage 1540 (e.g., in a microcontroller) if the memory 1530 is non-volatile, may include memory 1530 without a cache 1520 for specialized processors 1515, or the like. Various combinations of cache 1520, memory 1530, and/or storage 1540, and uses of three-dimensional memory 1550 for cache 1520, memory 1530, storage 1540, and/or other applications will be clear in view of this disclosure.

In various embodiments, the three-dimensional memory 1550 may include one or more chips, packages, die, or other integrated circuit devices comprising three-dimensional memory arrays with multiple layers of memory cells, disposed on one or more printed circuit boards, storage housings, and/or other mechanical and/or electrical support structures. For example, one or more dual inline memory modules (DIMMs), one or more expansion cards and/or daughter cards, a solid-state-drive (SSD) or other storage device, and/or another memory and/or storage form factor may comprise the three-dimensional memory 1550. The three-dimensional memory 1550 may be integrated with and/or mounted on a motherboard of the computing device 1510, installed in a port and/or slot of the computing device 1510, installed on a different computing device 1510 and/or a dedicated storage appliance on a network, in communication with a computing device 1510 over an external bus, or the like.

The three-dimensional memory 1550, in various embodiments, may include one or more memory dies. A memory die may include multiple layers of memory cells in a three-dimensional memory array. In various embodiments, three-dimensional memory may include magnetoresistive RAM (MRAM), phase change memory (PCM), resistive RAM (ReRAM), NOR Flash memory, NAND Flash memory, Silicon-Oxide-Nitride-Oxide-Silicon (SONOS) memory, or the like.

In certain embodiments, the three-dimensional memory 1550 may include a plurality of planar memory cells forming a three-dimensional array, a plurality of word lines extending horizontally across the layers (e.g., in-plane), and a plurality of selector columns or pillars extending vertically through the plurality of layers. In further embodiments, the selector columns or pillars may be coupled to the memory cells, and may include central conductors surrounded by one or more concentric selective layers. In various embodiments, one or more selective layers may permit an electrical current through a cell, between a word line and a central conductor, in response to a voltage satisfying a threshold. In certain embodiments, a selector column or pillar that extends through a plurality of layers of planar memory cells may facilitate reading to or writing from individual memory cells by limiting leakage current through other cells. Additionally, in further embodiments, forming a selector pillar or column that extends through a plurality of layers may simplify manufacturing compared to forming selector devices in individual layers alternating with memory cell layers.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

What is claimed is:

1. A reference voltage generator circuit comprising:

a current control circuit coupled to a first node and a second node and configured to feed a first current to the first node by mirroring a second current at the second node that is based on a supply voltage;

complimentary metal-on-semiconductor field-effect transistors (MOSFETs) including:

a first complimentary MOSFET connected to the first node and having a first threshold voltage, and a second complimentary MOSFET connected to the second node and having a second threshold voltage that is greater than the first threshold voltage;

a voltage output node connected to the first and second complimentary MOSFETs and configured to output a voltage based on the first and second complimentary MOSFETs operating in respective saturation regions; and a startup circuit connected to the second node and configured to remove a degenerate point by charging the second node to a non-zero current, wherein the second complimentary MOSFET receives the second current responsive to waiting for a settling period after charging the second node to the non-zero current.

2. The reference voltage generator circuit of claim 1, wherein the first and second complimentary MOSFETs are n-channel MOSFETs.

3. The reference voltage generator circuit of claim 1, wherein a drain terminal of the first complimentary MOSFET is connected to a gate terminal of the first complimentary MOSFET, a drain terminal of the second complimentary MOSFET is connected to a gate terminal of the second complimentary MOSFET and the second node, and source terminals of the first and second complimentary MOSFETs are connected.

4. The reference voltage generator circuit of claim 1, further comprising:

a first resistor having a first terminal connected to the first node and a second terminal connected to a drain terminal and a gate terminal of the first complimentary MOSFET; and a second resistor having:

a first terminal connected to source terminals of the first and second complimentary MOSFETS and a second terminal, and a second terminal connected to the current control circuit.

5. The reference voltage generator circuit of claim 4, wherein the second resistor is a tunable resistor.

6. The reference voltage generator circuit of claim 4, wherein the first terminal of the first resistor receives the first current from the first node and the drain terminal of the second resistor receives the second current from the second node.

7. The reference voltage generator circuit of claim 1, wherein the startup circuit is configured to charge the second node to a non-zero current.

8. The reference voltage generator circuit of claim 7, wherein the startup circuit comprises at least one MOSFET having a source terminal connected to the second node and a drain terminal connected to the supply voltage.

9. The reference voltage generator circuit of claim 7, wherein the current control circuit comprises a plurality of MOSFETS, each MOSFET of the plurality of MOSFETs having a gate terminal connected to the other MOSFETs for the plurality of MOSFETs, and wherein the at least one MOSFET of the startup circuit comprises a gate terminal connected to the gate terminals of the plurality of MOSFETs.

10. A method comprising:

removing a degenerate point by charging a first node to a non-zero current, responsive to waiting for a settling period after charging the first node to the non-zero current, feeding a first current to a first complimentary metal-on-semiconductor field-effect transistor (MOSFET) based on charging the first node connected to a first complimentary MOSFET;

mirroring the first current at a first resistor based on negative feedback of an operational amplifier connected to the first complimentary MOSFET, wherein a first voltage level at the first complimentary MOSFET is approximately equal to a second voltage level at the first resistor according to the first current;

activating the first complimentary MOSFET and a second complimentary MOSFET responsive to the first and second voltages levels, respectively, wherein a first threshold voltage of the first complimentary MOSFET is greater than a second threshold voltage of the second complimentary MOSFET; and outputting a reference voltage based on activating the first complimentary MOSFET and the second complimentary MOSFET.

11. The method of claim 10, wherein source terminals of the first and second complimentary MOSFETs are connected to each other, and wherein the method further comprises:

generating a third current at the source terminals of the first and second complimentary MOSFETs that is based on gate-to-source voltage levels of the first and second complimentary MOSFETs and a resistance of the first resistor.

12. The method of claim 11, further comprising:

flowing the third current through a second resistor, wherein the output reference voltage is based on a ratio of a resistance of the second resistor over the resistance of the first resistor and a difference between the gate-to-source voltage levels of the first and second complimentary MOSFETs.

13. The method of claim 10, further comprising:

selecting the first and second complimentary MOSFETs and the first resistor based on minimizing a temperature coefficient and line regulation.

14. An integrated circuit comprising:

a first stage circuit configured to output a first reference voltage based on a supply voltage; and a second stage circuit configured to receive an input voltage based on the first reference voltage and output a second reference voltage, wherein the first stage circuit comprises a first pair of complimentary metal-on-semiconductor field-effect transistor (MOSFETs), the first pair of complimentary MOSFETs including a first complimentary MOSFET having a first threshold voltage, and a second complimentary MOSFET having a second threshold voltage that is greater than the first threshold voltage, and wherein the second stage circuit comprises a second pair of complimentary MOSFETS, the second pair of complimentary MOSFETs including a third complimentary MOSFET having a third threshold voltage, and a fourth complimentary MOSFET having a fourth threshold voltage that is greater than the third threshold voltage.

15. The integrated circuit of claim 14, further comprising an operational amplifier configured to receive the first reference voltage and output the input voltage to the second stage circuit.

16. The integrated circuit of claim 14, wherein the first stage circuit further comprises:

a first resistor coupled to a drain terminal of the first complimentary MOSFET; and a second resistor coupled to source terminals of the first and second complimentary MOSFETS, wherein the first reference voltage is based on resistances of the first and second resistors and gate-to-source voltages of the first and second complimentary MOSFETs, when activated.

17. The integrated circuit of claim 16, wherein the first stage circuit further comprises a current control circuit configured to supply a first current to the second complimentary MOSFET and mirror the first current supplied as a second current to the first resistor.

18. The integrated circuit of claim 14, wherein the first stage circuit is identical to the second stage circuit.

19. The integrated circuit of claim 14, wherein the first stage circuit further comprises:

a first startup circuit configured to remove a degenerate point of the first stage circuit.

20. The integrated circuit of claim 19, wherein the second stage circuit further comprises:

a second startup circuit configured to remove a degenerate point of the second stage circuit.

* * * * *